(12) United States Patent
Driscoll et al.

(10) Patent No.: US 9,748,644 B2
(45) Date of Patent: *Aug. 29, 2017

(54) ELECTROMAGNETIC BEAM STEERING ANTENNA

(71) Applicant: Elwha LLC, Bellevue, WA (US)

(72) Inventors: Tom Driscoll, San Diego, CA (US); Roderick A. Hyde, Redmond, WA (US); Muriel Y. Ishikawa, Livermore, CA (US); Jordin T. Kare, San Jose, CA (US); Nathan P. Myhrvold, Medina, WA (US); Tony S. Pan, Bellevue, WA (US); Clarence T. Tegreene, Mercer Island, WA (US); Yaroslav A. Urzhumov, Bellevue, WA (US); Lowell L. Wood, Jr., Bellevue, WA (US); Victoria Y. H. Wood, Livermore, CA (US)

(73) Assignee: Elwha LLC

(*) Notice: Subject to any disclaimer, the term of this patent is extended or adjusted under 35 U.S.C. 154(b) by 0 days.

This patent is subject to a terminal disclaimer.

(21) Appl. No.: 15/397,884

(22) Filed: Jan. 4, 2017

(65) Prior Publication Data

US 2017/0125899 A1 May 4, 2017

Related U.S. Application Data

(63) Continuation of application No. 14/803,289, filed on Jul. 20, 2015, now Pat. No. 9,577,327.

(51) Int. Cl.
*H01Q 3/14* (2006.01)
*H01Q 15/02* (2006.01)

(52) U.S. Cl.
CPC ............ *H01Q 3/14* (2013.01); *H01Q 15/02* (2013.01)

(58) Field of Classification Search
CPC ...................................................... H01Q 1/00
(Continued)

(56) References Cited

U.S. PATENT DOCUMENTS 6,344,937 B1 2/2002 Sparrold et al.
6,792,028 B2 * 9/2004 Cook ................... G02B 26/106
372/100

(Continued)

OTHER PUBLICATIONS

"Gradient-index optics", located at https://en.wikipedia.org/w/index.php?title=Gradient-index_optics&oldid=631220824; Oct. 26, 2014; pp. 1-4; Wikipedia.

(Continued)

*Primary Examiner* — Huedung Mancuso

(57) ABSTRACT

Described embodiments include an electromagnetic beam steering apparatus. The apparatus includes a first blazed transmission diffraction grating component configured to angularly deflect an electromagnetic beam at a first blaze angle. The apparatus includes a second blazed transmission diffraction grating component configured to angularly deflect an electromagnetic beam at a second blaze angle. The apparatus includes an electromagnetic beam steering structure configured to independently rotate the first blazed transmission diffraction grating component and the second blazed transmission diffraction grating component about a coaxial axis such that an electromagnetic beam incident on the first blazed transmission diffraction grating component exits the second blazed transmission diffraction grating component as a steered electromagnetic beam.

34 Claims, 17 Drawing Sheets

(58) Field of Classification Search
USPC .............................. 343/907; 372/102, 98, 99
See application file for complete search history.

(56) References Cited

U.S. PATENT DOCUMENTS

| | | | |
|---|---|---|---|
| 7,239,463 | B2 | 7/2007 | Braun et al. |
| 7,538,946 | B2 | 5/2009 | Smith et al. |
| 7,642,978 | B2 | 1/2010 | Braunstein et al. |
| 7,777,690 | B2 | 8/2010 | Winsor |
| 8,614,743 | B2 | 12/2013 | Winsor |
| 2010/0156573 | A1 | 6/2010 | Smith et al. |
| 2012/0039567 | A1* | 2/2012 | Herman ............... G02B 6/124 385/37 |
| 2012/0307352 | A1* | 12/2012 | Jain ..................... E06B 9/24 359/350 |
| 2013/0208332 | A1 | 8/2013 | Yu et al. |

OTHER PUBLICATIONS

Smith et al.; "Gradient index metamaterials"; Physical Review E 71; Mar. 17, 2005; pp. 1-6; The American Physical Society.

Tsai et al.; "Design and fabrication of a metamaterial gradient index diffraction grating at infrared wavelengths"; Optics Express; Nov. 14, 2011; pp. 1-13; vol. 19 No. 24; OSA.

Aieta et al.; "Multiwavelength achromatic metasurfaces by dispersive phase compensation"; Sciencexpress; Feb. 19, 2015; pp. 1-8.

Allen et al.; "Design and fabrication of an RF GRIN lens using 3D printing technology"; SPIE Digital Library; Mar. 27, 2013; pp. 1-2.

Costa et al.; "Achromatic lens based on a nanowire material with anomalous dispersion"; Optics Express; Jun. 18, 2012; pp. 13915-13922; vol. 20, No. 13.

"Effective medium approximations"; Wikipedia; Bearing a date of Dec. 6, 2014; pp. 1-6; located at: http://en.wikipedia.org/ wiki/ Effective_medium_approximations.

Gratings, Richardson; "Technical Note 4—Transmission Gratings"; Grating Lab; Bearing a date of Apr. 8, 2015; located at: http://www.gratinglab.com/Information/Technical_Notes/TechNote4.aspx "Kymeta Technology"; Kymeta; Bearing a date of Mar. 4, 2015; p. 1; located at: http://www.kymetacorp.com/technology/.

Meng et al.; "Automatic Design of Broadband Gradient Index Metamaterial Lens for Gain Enhancement of Circularly Polarized Antennas"; Progress in Electromagnetics Research; Bearing a date of Jul. 7, 2013; pp. 17-32; vol. 141.

Oh et al.; "A new beam steering concept: Risley gratings"; Proc. of SPIE; Bearing a date of Jul. 22, 2010; pp. 74660J-1 to 74660J-8.

"Photonic Metamaterial"; Wikipedia; Bearing a date of Nov. 10, 2014; pp. 1-11; located at: http://en.wikipedia.org/wiki/Photonic_metamaterial.

Schwarze, Craig; "A New Look at Risley Prisms"; Photonics Spectra; Bearing a date of Apr. 8, 2015; pp. 1-4; located at: http://www.photonics.com/Article.aspx?AID=25652.

Smith et al.; "Analysis of a Gradient Index Metamaterial Blazed Diffraction Grating"; IEEE Antennas and Wireless Propagation Letters; Bearing a date of Dec. 14, 2011; pp. 1605-1608; vol. 10.

Sullivan, Mark T.; "Synopsis of 'Risley Prism Beam Pointer'"; Bearing a date of Nov. 13, 2006; pp. 1-5.

Yu et al.; "Flat optics with designer metasurfaces"; Nature Materials; Feb. 2014; pp. 139-150; vol. 13.

Yu et al.; "Light Propagation with Phase Discontinuities: Generalized Laws of Reflection and Refraction"; Science; Oct. 21, 2011; 29 Total Pages; vol. 334.

* cited by examiner

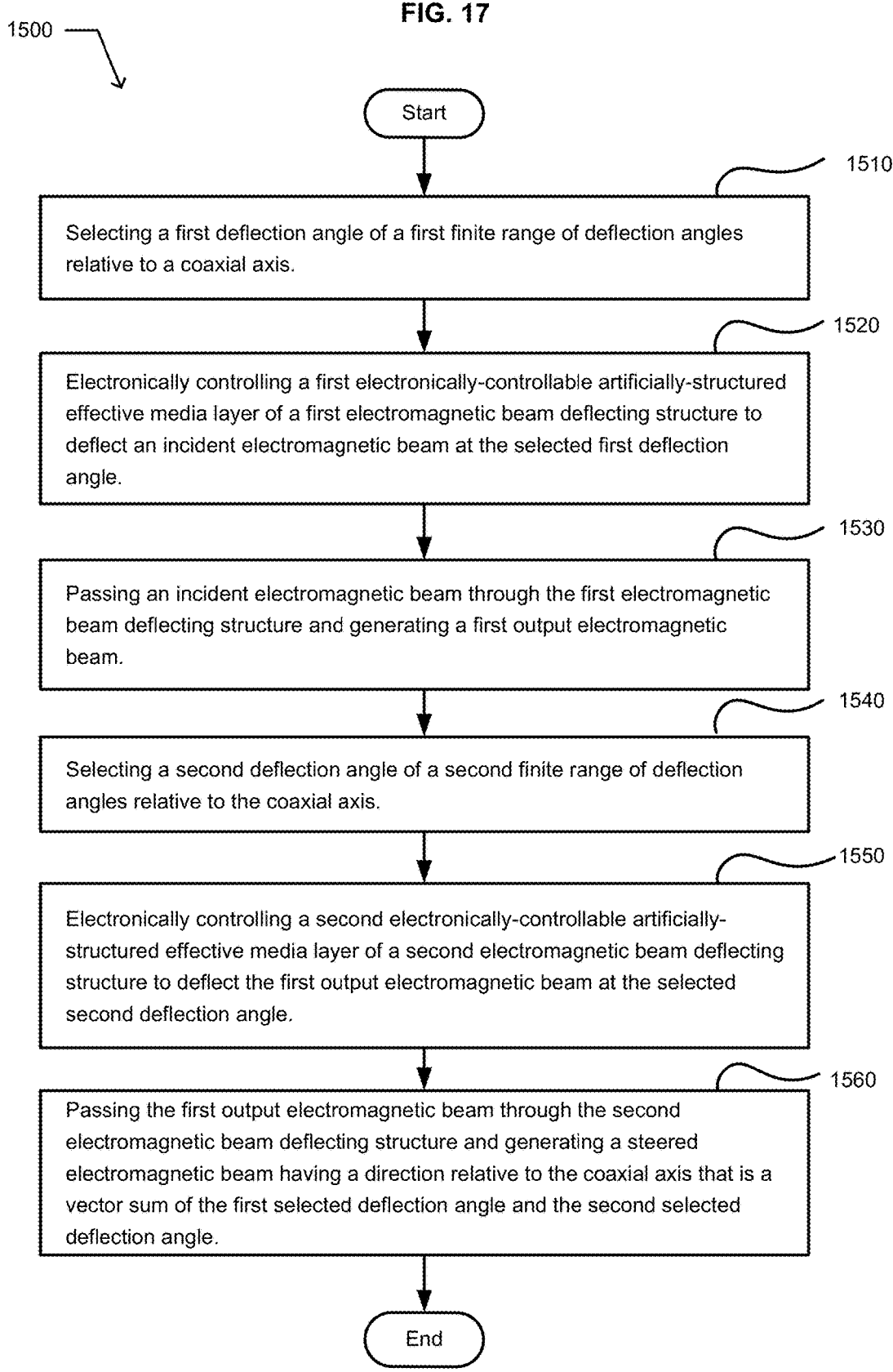

ELECTROMAGNETIC BEAM STEERING ANTENNA

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

The present application constitutes a continuation of U.S. patent application Ser. No. 14/803,289, entitled ELECTROMAGNETIC BEAM STEERING ANTENNA, naming TOM DRISCOLL, RODERICK A. HYDE, MURIEL Y. ISHIKAWA, JORDIN T. KARE, NATHAN P. MYHRVOLD, TONY S. PAN, CLARENCE T. TEGREENE, YAROSLAV A. URZHUMOV, LOWELL L. WOOD, JR., VICTORIA Y. H. WOOD as inventors, filed 20, Jul. 2015, which is currently co-pending or is an application of which a currently co-pending application is entitled to the benefit of the filing date.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes an electromagnetic beam steering apparatus. The electromagnetic beam steering apparatus includes a first blazed transmission diffraction grating component configured to angularly deflect an electromagnetic beam at a first blaze angle. The electromagnetic beam steering apparatus includes a second blazed transmission diffraction grating component configured to angularly deflect an electromagnetic beam at a second blaze angle. The electromagnetic beam steering apparatus includes an electromagnetic beam steering structure configured to independently rotate the first blazed transmission diffraction grating component and the second blazed transmission diffraction grating component about a coaxial axis such that an electromagnetic beam incident on the first blazed transmission diffraction grating component exits the second blazed transmission diffraction grating component as a steered electromagnetic beam.

In an embodiment, the apparatus includes a beam controller configured to calculate a rotational position of the first blazed transmission diffraction grating component about the coaxial axis and a rotational position of the second blazed transmission diffraction grating component pointing the steered electromagnetic beam at a selected target. In an embodiment, the apparatus includes an electromagnetic beam generator configured to transmit the electromagnetic beam.

For example, and without limitation, an embodiment of the subject matter described herein includes a method. The method includes rotating the first blazed transmission diffraction grating component around the coaxial axis to a first selected position, and rotating the second blazed transmission diffraction grating component around the coaxial axis to a second selected position. The steered electromagnetic beam has an azimuth angle $\theta$ and a zenith angle $\phi$ between zero and a finite angle from the coaxial axis. The azimuth angle $\theta$ and the zenith angle $\phi$ are responsive to the first blaze angle, the second blaze angle, the first selected position, and the second selected position.

In an embodiment, the method includes receiving information indicative of a position of a target in a three dimensional space, and determining the first selected position and the second selected position pointing the steered electromagnetic beam at the target. In an embodiment, the method includes initiating the electromagnetic beam incident on the first blazed transmission diffraction grating component.

For example, and without limitation, an embodiment of the subject matter described herein includes an electromagnetic beam steering apparatus. The apparatus includes a first blazed transmission diffraction grating component having a first volumetric distribution of dielectric constants configured to angularly deflect an electromagnetic beam at a first blaze angle. The apparatus includes a second blazed transmission diffraction grating component having a second volumetric distribution of dielectric constants configured to angularly deflect the electromagnetic beam at a second blaze angle. The apparatus includes an electromagnetic beam steering structure configured to independently rotate the first blazed transmission diffraction grating component and the second blazed transmission diffraction grating component about a coaxial axis such that an electromagnetic beam incident on the first blazed transmission diffraction grating component exits the second blazed transmission diffraction grating component as a steered electromagnetic beam.

In an embodiment, the apparatus includes a beam controller configured to calculate a rotational position of the first blazed transmission diffraction grating component about the coaxial axis and a rotational position of the second blazed transmission diffraction grating component about the coaxial axis pointing the steered electromagnetic beam at a selected target. In an embodiment, the apparatus includes an electromagnetic beam generator configured to transmit the electromagnetic beam.

For example, and without limitation, an embodiment of the subject matter described herein includes a method. The method includes passing an electromagnetic beam through a first blazed transmission diffraction grating component having a first volumetric distribution of dielectric constants configured to angularly deflect the electromagnetic beam at a first blaze angle relative to a coaxial axis and generating a first output electromagnetic beam. The method includes passing the first output electromagnetic beam through a second blazed transmission diffraction grating component having a second volumetric distribution of dielectric constants configured to angularly deflect the first output electromagnetic beam at a second blaze angle relative to the coaxial axis and generating a steered electromagnetic beam. The steered electromagnetic beam having a direction relative to the coaxial axis that is a vector sum of the first blaze angle and the second blaze angle.

In an embodiment, the method includes rotating the first blazed transmission diffraction grating component around the coaxial axis to a first selected position, and rotating the second blazed transmission diffraction grating component around the coaxial axis to a second selected position. The steered electromagnetic beam has an azimuth angle θ and a zenith angle ϕ between zero and a finite angle from the coaxial axis. The azimuth angle θ and the zenith angle ϕ are responsive to the first blaze angle, the second blaze angle, the first selected position, and the second selected position. In an embodiment, the method includes receiving information indicative of a position of a target, and determining the first selected position and the second selected position pointing the steered electromagnetic beam at the target. In an embodiment, the method includes initiating the electromagnetic beam incident on the first blazed transmission diffraction grating component.

For example, and without limitation, an embodiment of the subject matter described herein includes a dual-channel electromagnetic beam steering apparatus. The apparatus includes a first dual-channel blazed transmission diffraction grating component having a first volumetric distribution of dielectric constants configured to deflect at a first blaze angle (i) a first electromagnetic beam having a first frequency and (ii) a second electromagnetic beam having a second frequency. The apparatus includes a second dual-channel blazed transmission diffraction grating component having a second volumetric distribution of dielectric constants configured to deflect at a second blaze angle (i) the first electromagnetic beam and (ii) the second electromagnetic beam. The apparatus includes electromagnetic beam steering structure configured to independently rotate the first dual-channel blazed transmission diffraction grating component and second dual-channel blazed transmission diffraction grating component about a coaxial axis such that the first electromagnetic beam or second electromagnetic beam incident on the first dual-channel blazed transmission diffraction grating component exit the second dual-channel blazed transmission diffraction grating component as a steered first electromagnetic beam or a steered second electromagnetic beam.

In an embodiment, the apparatus includes a beam controller configured to calculate a rotational position of the first dual-channel blazed transmission diffraction grating component about the coaxial axis and a rotational position of the second dual-channel blazed transmission diffraction grating component pointing the steered electromagnetic beam at a selected target. In an embodiment, the apparatus includes an electromagnetic beam generator configured to transmit the electromagnetic beam.

For example, and without limitation, an embodiment of the subject matter described herein includes a method. The method includes passing a first incident electromagnetic beam having a first frequency or a second incident electromagnetic beam having a second frequency through a first dual-channel blazed transmission diffraction grating component having a first volumetric distribution of dielectric constants deflecting the first incident electromagnetic beam or the second incident electromagnetic beam at a first blaze angle relative to a coaxial axis, and generating a first output electromagnetic beam having the first frequency or a second output electromagnetic beam having the second frequency. The method includes passing the first output electromagnetic beam or the second output electromagnetic beam through a second dual-channel blazed transmission diffraction grating component having a second volumetric distribution of dielectric constants deflecting the first output electromagnetic beam or the second output electromagnetic beam at a second blaze angle relative to the coaxial axis, and generating a first steered electromagnetic beam having the first frequency or a second steered electromagnetic beam having the second frequency. The first steered electromagnetic beam and the second steered electromagnetic beam both having a direction relative to the coaxial axis that is a vector sum of the first blaze angle and the second blaze angle.

In an embodiment, the method includes rotating the first dual-channel blazed transmission diffraction grating component around the coaxial axis to a first selected position, and rotating the second dual-channel blazed transmission diffraction grating component around the coaxial axis to a second selected position. The first steered electromagnetic beam and the second steered electromagnetic beam each have an azimuth angle θ and a zenith angle ϕ between zero and a finite angle from the coaxial axis. The azimuth angle θ and the zenith angle ϕ are responsive to the first blaze angle, the second blaze angle, the first selected position, and the second selected position.

In an embodiment, the method includes receiving information indicative of a position of a target in a three dimensional space, and determining the first selected position and the second selected position pointing the steered electromagnetic beam at the target. In an embodiment, the method includes initiating the first electromagnetic beam or the second electromagnetic beam incident on the first dual-channel blazed transmission diffraction grating component.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 17 illustrates an example operational flow.

DETAILED DESCRIPTION

Figure 1:
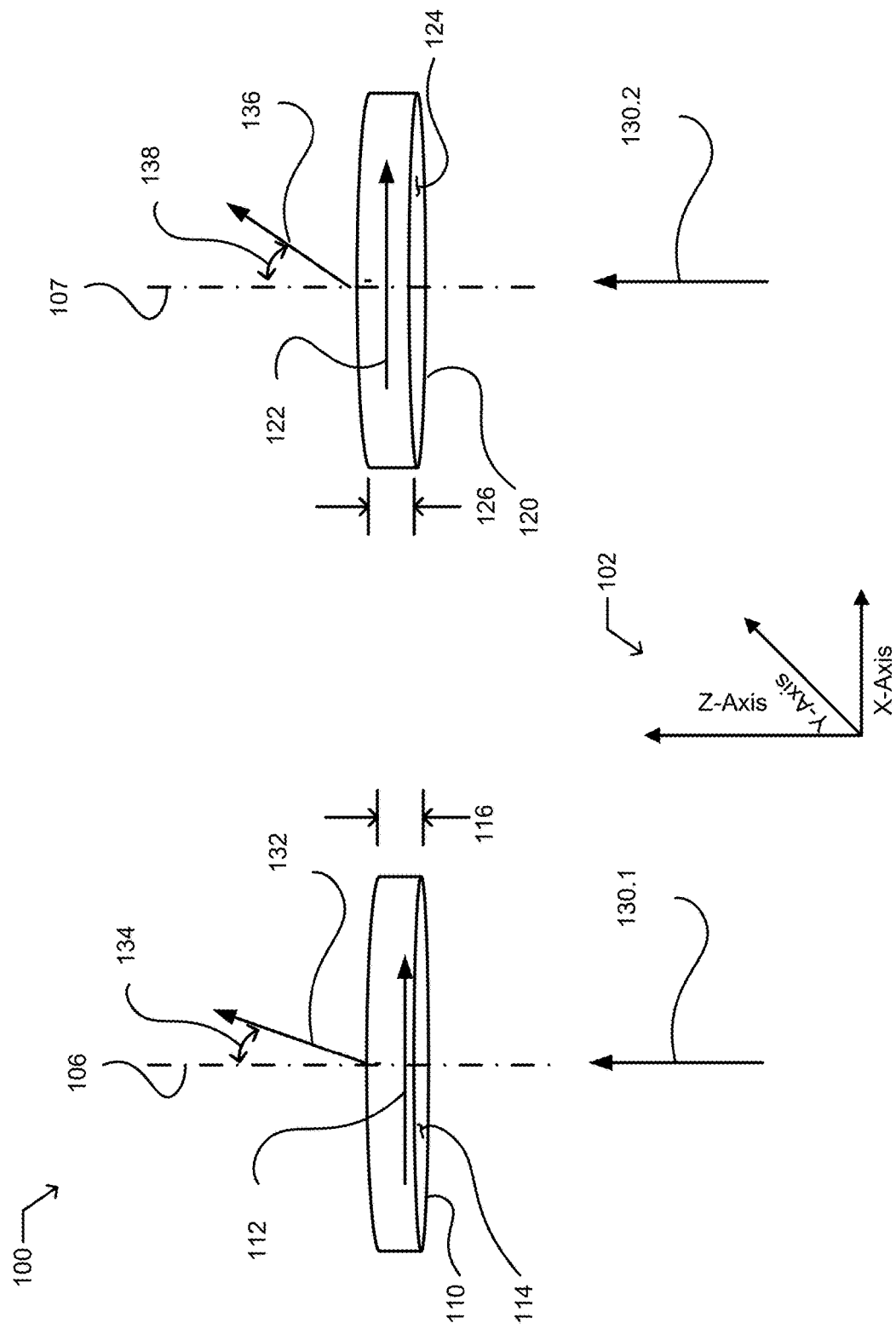
FIG. 1 illustrates an example first planar refractive component and a second planar refractive component.

This application makes reference to technologies described more fully in U.S. patent application Ser. No. 14/257,175, entitled SUB-NYQUIST HOLOGRAPHIC APERTURE ANTENNA CONFIGURED TO DEFINE SELECTABLE, ARBITRARY COMPLEX ELECTROMAGNETIC FIELDS, naming Pai-Yen Chen et al. as inventors, filed on Apr. 21, 2014. That application is incorporated by reference herein, including any subject matter included by reference in that application.

This application makes reference to technologies described more fully in U.S. patent application Ser. No. 14/257,187, entitled SUB-NYQUIST HOLOGRAPHIC APERTURE ANTENNA CONFIGURED TO DEFINE SELECTABLE, ARBITRARY COMPLEX ELECTROMAGNETIC FIELDS, naming Pai-Yen Chen et al. as inventors, filed on Apr. 21, 2014. That application is incorporated by reference herein, including any subject matter included by reference in that application.

This application makes reference to technologies described more fully in U.S. patent application Ser. No. 14/257,386, entitled SYSTEM WIRELESSLY TRANSFERRING POWER TO A TARGET DEVICE OVER A TESTED TRANSMISSION PATHWAY, naming Pai-Yen Chen et al. as inventors, filed on Apr. 21, 2014. That application is incorporated by reference herein, including any subject matter included by reference in that application.

This application makes reference to technologies described more fully in U.S. patent application Ser. No. 14/257,415, entitled SYSTEM WIRELESSLY TRANSFERRING POWER TO A TARGET DEVICE OVER A MODELED TRANSMISSION PATHWAY WITHOUT EXCEEDING A RADIATION LIMIT FOR HUMAN BEINGS, naming Pai-Yen Chen et al. as inventors, filed on Apr. 21, 2014. That application is incorporated by reference herein, including any subject matter included by reference in that application.

This application makes reference to technologies described more fully in U.S. patent application Ser. No. 12/286,740, now U.S. Pat. No. 8,168,930, entitled BEAM POWER FOR LOCAL RECEIVERS, naming Roderick A. Hyde et al. as inventors, filed on Sep. 30, 2008. That application is incorporated by reference herein, including any subject matter included by reference in that application.

This application makes reference to technologies described more fully in U.S. patent application Ser. No. 12/286,737, now U.S. Pat. No. 8,058,609, entitled BEAM POWER WITH MULTIPOINT BROADCAST, naming Roderick A. Hyde et al. as inventors, filed on Sep. 30, 2008. That application is incorporated by reference herein, including any subject matter included by reference in that application.

This application makes reference to technologies described more fully in U.S. patent application Ser. No. 12/286,755, now U.S. Pat. No. 8,803,053, entitled BEAM POWER WITH MULTIPOINT RECEPTION, naming Roderick A. Hyde et al. as inventors, filed on Sep. 30, 2008. That application is incorporated by reference herein, including any subject matter included by reference in that application.

This application makes reference to technologies described more fully in U.S. patent application Ser. No. 12/286,741, now U.S. Pat. No. 7,786,419, entitled BEAM POWER WITH BEAM REDIRECTION, naming Roderick A. Hyde et al. as inventors, filed on Sep. 30, 2008. That application is incorporated by reference herein, including any subject matter included by reference in that application.

This application makes reference to technologies described more fully in U.S. Patent Application No. 61/455,171, entitled SURFACE SCATTERING ANTENNAS, naming Nathan Kundtz as inventor, filed Oct. 15, 2010. That application is incorporated by reference herein, including any subject matter included by reference in that application.

This application makes reference to technologies described more fully in U.S. patent application Ser. No. 13/317,338, entitled SURFACE SCATTERING ANTENNAS, naming Adam Bily et al. as inventors, filed Oct. 14, 2011. That application is incorporated by reference herein, including any subject matter included by reference in that application.

This application makes reference to technologies described more fully in U.S. patent application Ser. No. 13/838,934, entitled SURFACE SCATTERING ANTENNA IMPROVEMENTS, naming Adam Bily et al. as inventors, filed Mar. 15, 2013. That application is incorporated by reference herein, including any subject matter included by reference in that application.

This application makes reference to technologies described more fully in U.S. patent application Ser. No. 14/102,253, entitled SURFACE SCATTERING REFLECTOR ANTENNA, naming Jeffrey A. Bowers et al. as inventors, filed Dec. 10, 2013. That application is incorporated by reference herein, including any subject matter included by reference in that application.

This application makes reference to technologies described more fully in U.S. patent application Ser. No. 14/226,213, entitled SURFACE SCATTERING ANTENNA ARRAY, naming Jeffrey A. Bowers et al. as inventors, filed Mar. 26, 2014, is related to the present application. That application is incorporated by reference herein, including any subject matter included by reference in that application.

This application makes reference to technologies described more fully in U.S. patent application Ser. No. 14/334,368, entitled ARTIFICIALLY STRUCTURED $B_1$ MAGNETIC FIELD GENERATOR FOR MRI AND NMR DEVICES, naming Tom Driscoll et al. as inventors, filed Jul. 17, 2014. That application is incorporated by reference herein, including any subject matter included by reference in that application.

This application makes reference to technologies described more fully in U.S. patent application Ser. No. 14/334,398, entitled ARTIFICIALLY STRUCTURED UNIT CELLS PROVIDING LOCALIZED $B_1$ MAGNETIC FIELDS FOR MRI AND NMR DEVICES, naming Tom Driscoll et al. as inventors, filed Jul. 17, 2014. That application is incorporated by reference herein, including any subject matter included by reference in that application.

This application makes reference to technologies described more fully in U.S. patent application Ser. No. 14/334,424, entitled ELECTRONICALLY CONTROL- LABLE GROUPS OF ARTIFICIALLY STRUCTURED UNIT CELLS PROVIDING LOCALIZED $B_1$ MAGNETIC FIELDS FOR MRI AND NMR DEVICES, naming Tom Driscoll et al. as inventors, filed Jul. 17, 2014. That application is incorporated by reference herein, including any subject matter included by reference in that application.

This application makes reference to technologies described more fully in U.S. patent application Ser. No. 14/334,450, entitled CANCELLATION OF AN ELECTRIC FIELD COMPONENT OF A MAGNETIC FIELD GENERATED BY ARTIFICIALLY STRUCTURED ELECTROMAGNETIC UNIT CELLS, naming Tom Driscoll et al. as inventors, filed Jul. 17, 2014. That application is incorporated by reference herein, including any subject matter included by reference in that application.

This application makes reference to technologies described more fully in U.S. patent application Ser. No. 14/619,393, entitled MINIMALLY-INVASIVE TISSUE ABLATION USING HIGH CONTRAST ELECTRONIC FIELDS, naming Yaroslav Urzhumov as inventor, filed Feb. 11, 2015. That application is incorporated by reference herein, including any subject matter included by reference in that application.

This application makes reference to technologies described more fully in U.S. patent application Ser. No. 14/689,871, entitled METHODS AND SYSTEM FOR PERFORMING MAGNETIC INDUCTION TOMOGRAPHY, naming Tom Driscoll et al. as inventors, filed Apr. 17, 2015. That application is incorporated by reference herein, including any subject matter included by reference in that application.

This application makes reference to technologies described more fully in U.S. patent application Ser. No. 14/619,456, entitled ELECTROMAGNETIC FIELD PERTURBING OBJECT HAVING A BIOCOMPATIBLE EXTERIOR SURFACE AND A SELECTED DIELECTRIC PERMITTIVITY VALUE OR A SELECTED MAGNETIC PERMEABILITY VALUE, naming Yaroslav Urzhumov as inventor, filed Feb. 11, 2015. That application is incorporated by reference herein, including any subject matter included by reference in that application.

This application makes reference to technologies described more fully in U.S. patent application Ser. No. 14/638,961, entitled HOLOGRAPHIC MODE CONVERSION FOR ELECTROMAGNETIC RADIATION, naming Tom Driscoll et al. as inventors, filed Mar. 4, 2015. That application is incorporated by reference herein, including any subject matter included by reference in that application.

This application makes reference to technologies described more fully in U.S. patent application Ser. No. 14/708,043, entitled HOLOGRAPHIC MODE CONVERSION FOR TRANSMISSION LINES, naming Tom Driscoll et al. as inventors, filed May 8, 2015. That application is incorporated by reference herein, including any subject matter included by reference in that application.

This application makes reference to technologies described more fully in U.S. patent application Ser. No. 14/058,855, entitled ANTENNA SYSTEM FACILITATING REDUCTION OF INTERFERING SIGNALS, naming Roderick A. Hyde et al. as inventors, filed Oct. 21, 2013. That application is incorporated by reference herein, including any subject matter included by reference in that application.

This application makes reference to technologies described more fully in U.S. patent application Ser. No. 14/059,188, entitled ANTENNA SYSTEM HAVING AT LEAST TWO APERTURES FACILITATING REDUCTION OF INTERFERING SIGNALS, naming Roderick A. Hyde et al. as inventors, filed Oct. 21, 2013. That application is incorporated by reference herein, including any subject matter included by reference in that application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example first planar refractive component 110 and a second planar refractive component 120. The first planar refractive component includes a first tangential refractive index gradient 112 deflecting an electromagnetic beam at a first deflection angle 134 relative to an axis 106 normal (e.g. Z-axis 102) to a major surface 114 of the first planar refractive component. The electromagnetic beam is illustrated as an electromagnetic beam 130.1. The transmitted or refracted electromagnetic beam is illustrated by electromagnetic beam 132. In an embodiment, the first tangential refractive index gradient produces a gradual phase shift accumulation up to a across the major surface of the planar refractive component. In an embodiment, the phase shift is a function of a linear position along the major surface of the refractive component. In an embodiment, the electromagnetic beam includes a finite-width electromagnetic beam. In an embodiment, the electromagnetic beam includes a plane wave electromagnetic beam. In an embodiment, the first deflection angle is a function of phase gradients introduced by the first tangential refractive index gradient of the first planar refractive component. In an embodiment, the first planar component may have a cylindrical shape, a parallelepiped shape, or other shape with substantially parallel major surfaces in the XY plane of axis 102.

The second planar refractive component 120 includes a second tangential refractive index gradient 122 deflecting an electromagnetic beam at a second deflection angle 138 relative to an axis 107 normal (e.g. Z-axis 102) to a major surface 124 of the second planar refractive component. The electromagnetic beam is illustrated as an electromagnetic beam 130.2. The transmitted or refracted electromagnetic beam is illustrated by electromagnetic beam 136. In an embodiment, the second planar component may have a cylindrical shape, a parallelepiped shape, or other shape with substantially parallel major surfaces in the XY plane of axis 102.

Figure 2:
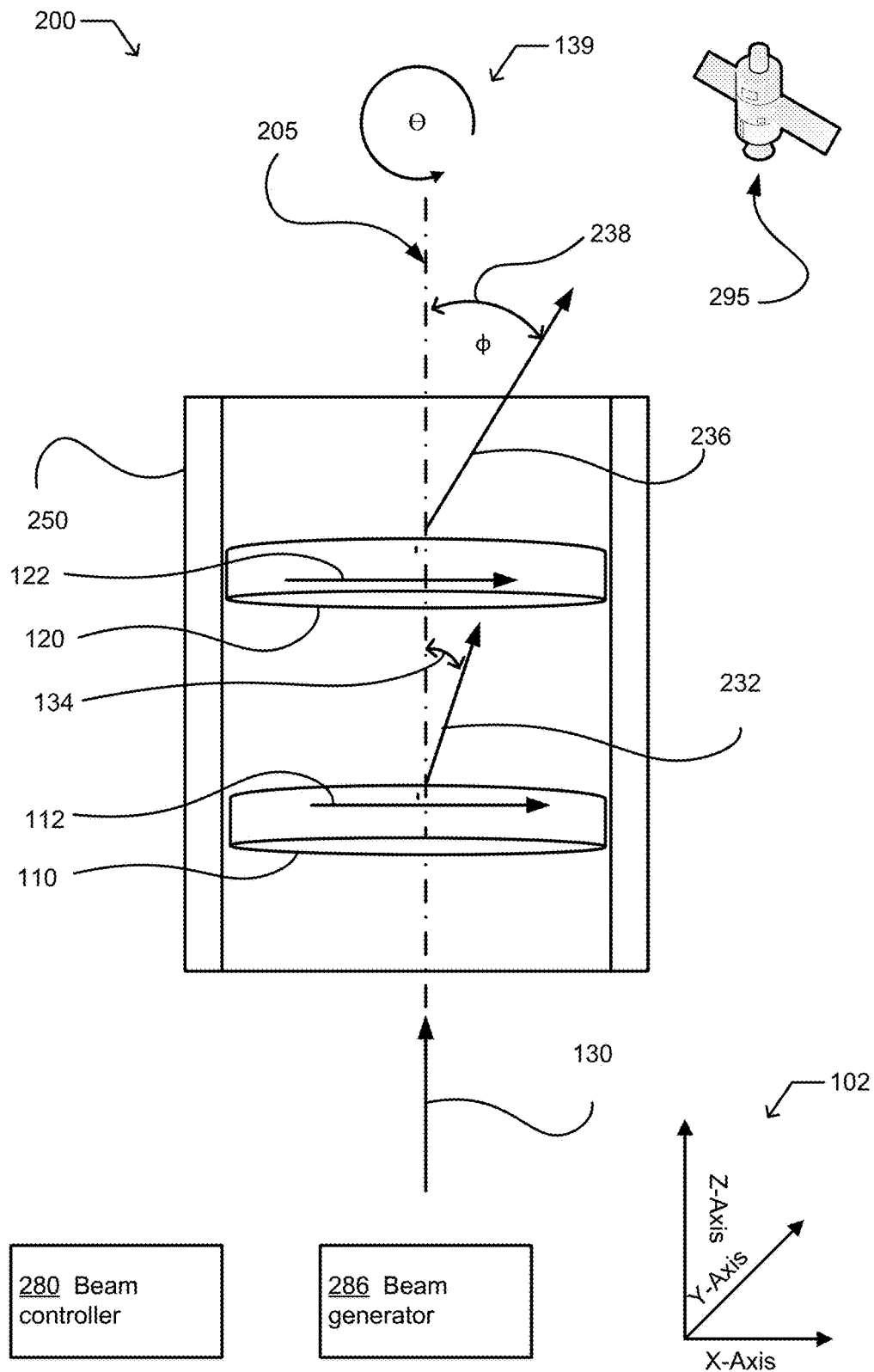
FIG. 2 illustrates an example electromagnetic beam steering apparatus.

FIG. 2 illustrates an example electromagnetic beam steering apparatus 200 and a reference three-dimensional axis 102. The electromagnetic beam steering apparatus includes the first planar refractive component 110 and the second planar refractive component 120. The electromagnetic beam steering apparatus includes an electromagnetic beam steering structure 250 configured to independently rotate 139 the first planar refractive component and the second planar refractive component about a coaxial axis 205 such that an electromagnetic beam 130 incident on the first planar refractive component exits the second planar refractive component as a steered electromagnetic beam 236. In an embodiment, the electromagnetic beam steering apparatus may steer an electromagnetic beam in a transmit mode or in a receive mode. For example, in an embodiment, the electromagnetic beam steering structure may function or operate in a Risley prism beam steering manner.

In an embodiment, the electromagnetic beam 130 includes a radiofrequency electromagnetic beam. For example, the radiofrequency electromagnetic beam may include a microwave band radiofrequency electromagnetic beam. For example, a radiofrequency electromagnetic beam may include a 1 GHz to 300 GHz radiofrequency electromagnetic beam. For example, the radiofrequency electromagnetic beam may include a radiofrequency electromagnetic beam with a free space wavelength between 30 cm to 1 mm. In an embodiment, the electromagnetic beam includes a light wavelength electromagnetic beam. For example, a light wavelength electromagnetic beam may include an infrared or a visible light wavelength electromagnetic beam.

In an embodiment, the first planar refractive component 110 includes two opposed generally planar and parallel major surfaces and a thickness 116 that is less than the free-space wavelength of the electromagnetic beam. In an embodiment, a planar surface of the two opposed generally planar and parallel major surfaces has a radius of curvature that is large relative to the thickness. In an embodiment, the radius of curvature is greater than ten times the thickness. In an embodiment, the radius of curvature includes a cylindrical radius of curvature. In an embodiment, a major surface 114 of the first planar refractive component includes a generally or substantially flat major surface. In an embodiment, a receiving or transmitting surface of the first planar refractive component includes an arbitrary surface approximating a flat surface.

In an embodiment, the first tangential refractive index gradient 112 of the first planar refractive component 110 includes a refractive index gradient coplanar with the first planar refractive component. In an embodiment, the first planar refractive component has a planar surface diameter greater than the free-space wavelength of the electromagnetic beam. In an embodiment, the first planar refractive component has a planar surface diameter much greater than the free-space wavelength of the electromagnetic beam.

In an embodiment, the first planar refractive component 110 and the second planar refractive component 120 each have a thickness 116 and 126 respectively that is less than the free-space wavelength of the incident electromagnetic beam 130 (hereafter free-space subwavelength thickness). In an embodiment, the free-space subwavelength thickness includes a subwavelength thickness of less than one-half of the free-space wavelength of the electromagnetic beam. In an embodiment, the free-space subwavelength thickness includes a subwavelength thickness of less than one-fifth of the free-space wavelength of the electromagnetic beam. In an embodiment, the free-space subwavelength thickness includes a subwavelength thickness of less than one-tenth of the free-space wavelength of the electromagnetic beam.

In an embodiment, the first planar refractive component 110 includes a first planar refractive component with a substantially uniform transmissivity. For example, uniformly transmissivity may include an approximately constant transmissivity independent of a position on the planar surface. In an embodiment, the first planar refractive component has a tangential refractive index gradient deflecting a normal incident electromagnetic beam 130 or 130.1 at a first deflection angle 134. In an embodiment, the first tangential refractive index gradient 112 of the first planar refractive component creates a linearly varying propagation delay. In an embodiment, the first planar refractive component includes a tangential refractive index gradient and a selectable electromagnetic beam impedance profile deflecting an incident electromagnetic beam 130 or 130.1 at a first deflection angle 134. For example, beam impedance controls reflectance, so as the refractive index increases, reflectivity goes up unless the beam impedance is adjusted to compensate. In an embodiment, the first planar refractive component includes a non-reflective first planar refractive component. For example, a non-reflective first planar refractive component may be implemented by impedance matching.

In an embodiment, the first planar refractive component 110 includes an artificially structured effective media. In an embodiment, an artificially structured effective media may include a composite material having at the constituent level varying and inhomogeneous materials, each having their own individual microscopic properties, and at the composite level effectively described by macroscopic properties. Thus, that composite material may be described as effective media. As used herein effective media may include the singular or plural. In an embodiment, the artificially structured effective media includes a composite material. In an embodiment, the artificially structured effective media includes an artificially structured subwavelength effective media. In an embodiment, the artificially structured effective media includes low-loss dielectrics. In an embodiment, the artificially structured effective media includes all-dielectric metamaterials. In an embodiment, the artificially structured effective media includes negative permittivity or negative permeability constituent materials. In an embodiment, the artificially structured effective media includes artificially structured subwavelength electromagnetic unit cells. For example, the artificially structured subwavelength electromagnetic unit cells may include at least three subwavelength electromagnetic unit cells having a varying spacing, permittivity, or permeability. In an embodiment, the artificially structured effective media includes artificially structured subwavelength metamaterial unit cells. In an embodiment, the artificially structured effective media includes an artificially structured meta-surface or meta-interface. For example, an artificially structured meta-surface or meta-interface may include a subwavelength unit cell structure. For example, an artificially structured meta-interface may include a concentrated negative permittivity or permeability in a thin interface. In an embodiment, the artificially structured effective media includes at least two subwavelength components having different electromagnetic beam dispersion characteristics. In an embodiment, the first planar refractive component 110 includes a first planar scattering component having the first tangential refractive index gradient 112.

In an embodiment, the first planar refractive component 110 includes a first composite structure having a first refractive subcomponent having a first tangential refractive index gradient deflecting an electromagnetic beam at a first sub-deflection angle (first deflected incident electromagnetic beam) and a second refractive subcomponent having a second tangential refractive index gradient deflecting the first deflected incident electromagnetic beam at a second sub-deflection angle. The first refractive subcomponent and the second refractive subcomponent are arranged in the first planar refractive component such that the electromagnetic beam passes through them in series. In an embodiment, the second planar refractive component 120 includes a second composite structure. The second composite structure includes a third tangential refractive index gradient deflecting a second electromagnetic beam incident on the second composite structure at a third sub-deflection angle (third deflected incident electromagnetic beam) and a fourth refractive subcomponent having a fourth tangential refractive index gradient deflecting the third deflected incident electromagnetic beam at a fourth sub-deflection angle. The third refractive subcomponent and the fourth refractive subcomponent are arranged in the second planar refractive component such that the electromagnetic beam passes through them in series.

In an embodiment, the first planar refractive component 110 includes a first achromatic planar refractive component having a first tangential refractive index gradient 112 deflecting an electromagnetic beam 130 or 130.1 at a first deflection angle 134 over a finite range of wavelengths. For example, a finite range of wavelengths includes a discrete set of wavelengths. An embodiment of an achromatic planar refractive component having a tangential refractive index gradient is described in F. Aieta, et. al, *Multiwavelength achromatic metasurfaces by dispersive phase compensation*, Sciencexpress 1 (19 Feb. 2015) (10.1126/science.aaa2494). In an embodiment, the first achromatic planar refractive component includes an artificially structured effective media creating an electromagnetic beam dispersion characteristic. In an embodiment, the artificially structured effective media includes an effective negative permittivity or negative permeability media. In an embodiment, the artificially structured effective media includes artificially structured subwavelength electromagnetic unit cells. In an embodiment, the artificially structured effective media includes artificially structured subwavelength metamaterial unit cells. In an embodiment, the artificially structured effective media includes artificially structured meta-surface. For example, an artificially structured meta-surface includes a subwavelength structure. In an embodiment, the achromatic planar refractive component includes a negatively dispersive refractive index as a function of frequency (dn/df<0). In an embodiment, the achromatic planar refractive component includes an artificially structured effective media having a negatively sloped refractive index as a function of frequency (dn/df<0). In an embodiment, the achromatic planar refractive component includes a first artificially structured effective media creating a first electromagnetic beam dispersion characteristic and a second artificially structured effective media creating a second electromagnetic beam dispersion characteristic. For example, the first artificially structured effective media and the second artificially structured effective media may be in different layers of the achromatic planar refractive component. For example, the first artificially structured effective media and the second artificially structured effective media may be intermingled in the achromatic planar refractive component.

In an embodiment, the first planar refractive component 110 and the second planar refractive component 120 each include an engineered dispersion compensation for an angular deflection variation as a function of frequency producing an achromatic response over a finite range of electromagnetic beam wavelengths. In an embodiment, the engineered dispersion compensation includes cancelling out the wavelength dependence of the diffraction phenomena. For example, the engineered dispersion compensation may include using a negatively sloped refractive index.

In an embodiment, the first deflection angle 134 is substantially the same as the second deflection angle 138. In an embodiment, the first deflection angle is within five degrees of the second deflection angle. In an embodiment, the first deflection angle is within 2.5 degrees of the second deflection angle. In an embodiment, the first planar refractive component 110 includes a first planar blazed transmission grating component deflecting an electromagnetic beam 130 or 130.1 at a first deflection angle 134. In an embodiment, the first deflection angle includes a first deflection angle optimized for beam steering.

In an embodiment, the first tangential refractive index gradient 112 includes a piecewise linear refractive index deflecting the electromagnetic beam 130 or 130.1 at the first deflection angle 134. In an embodiment, the first planar refractive component 110 and the second planar refractive component 120 each respectively include a substrate transparent to the electromagnetic beam. In an embodiment, the substrate includes a substrate nominally transparent to the electromagnetic beam.

In an embodiment, the first planar refractive component 110 includes an artificially structured effective media having an electronically-selectable tangential refractive index gradient 112 deflecting the electromagnetic beam 130 or 130.1 at a first selectable deflection angle 134 if in a first selected state and a deflecting the electromagnetic beam at a second selectable deflection angle if in a second selected state. For example, the first selected state may be an "off-state" and the second selected state may be an "on-state." In an alternative embodiment, the artificially structured effective media may include a composite structure having a first refractive subcomponent having a first tangential refractive index gradient deflecting the incident electromagnetic beam at a first deflection angle and a second refractive subcomponent having the electronically selectable refractive gradient.

In an embodiment, the major surface 114 of the first planar refractive component 110 includes at least two layers of voxels of artificially structured effective media. Each voxel of the artificially structured effective media having electronically-selectable tangential refractive index gradient deflecting an electromagnetic beam 130 or 130.1 at a first selected deflection angle if in a first selected state and a deflecting the electromagnetic beam at a second selected deflection angle if in a second selected state. For example, in an embodiment, the voxels of artificially structured effective media may include unit cells. For example, in an embodiment, the voxels of artificially structured effective media may be arranged in a three-dimensional assembly. For example, in an embodiment each voxel or unit cell has one of two fixed refractive index values, where one value is that of free space and the other value is the range of n=1.3-3. For example, in an embodiment, each voxel or unit cell could use one of two different refractive index values other than free space where a cell that is "off" has the reflective index value of free space. For example, in an embodiment, a major surface 114 of the first planar refractive component 110 includes at least three layers of voxels of artificially structured effective media providing a tunable phase gradient.

In an embodiment, the electromagnetic beam steering structure 250 includes an electronically controlled electromagnetic beam steering structure. In an embodiment, the electromagnetic beam steering structure is configured to independently and physically rotate or counter rotate the first planar refractive component and the second planar refractive component about the coaxial axis 205. In an embodiment, the coaxial axis is normal to the major surface 114 of the first planar refractive component 110 and the major surface 124 of the second planar refractive component 120. In an embodiment, the electromagnetic beam steering structure is configured to rotate the first planar refractive component and the second planar refractive component about the coaxial axis while maintaining an electromagnetic beam path alignment through the first planar refractive component and the second planar refractive component. In an embodiment, the electromagnetic beam steering structure is configured to rotate the first planar refractive component using an edge drive mechanism. For example, an edge drive mechanism may include a belt drive or a roller drive. For example, an edge drive mechanism may include separate motors for each component. In an embodiment, the electromagnetic beam steering structure is configured to rotate the first planar refractive component using an integral edge drive motor or an integral on-axis motor. For example, an integral edge drive may include magnetic coils coupled to a magnetic-material track on the first planar refractive component, or an inchworm mechanism. In an embodiment, the electromagnetic beam steering structure is configured to mechanically rotate the first planar refractive component using the integral edge drive motor. In an embodiment, the electromagnetic beam steering structure is configured to rotate the first planar refractive component and the second planar refractive component about the coaxial axis independently of each other. In an embodiment, the coaxial axis includes a coaxial axis rotationally symmetric and coaxial to each of the planar refractive components 110 and 120.

In an embodiment, the electromagnetic beam 130 includes a circularly polarized electromagnetic beam. In an embodiment, the first planar refractive component 110 and the second planar refractive component 120 each include a polarization-independent refractive index gradients 112 and 122.

In an embodiment, the apparatus 200 further includes a first quarter-wave plate positioned in an electromagnetic beam path between the first planar refractive component 110 and a source of the incident electromagnetic beam 130. In an embodiment, the apparatus includes a second quarter-wave plate positioned in an exit electromagnetic beam path downstream of the second planar refractive component 120. In this embodiment, the first quarter-wave plate converts linearly-polarized input electromagnetic beam into circularly-polarized radiation for steering, and the second quarter-wave plate converts the electromagnetic beam back to linearly-polarized if needed. In an embodiment, the quarter-wave plates may be integrated with antireflection layers on the planar refractive components.

In an embodiment, the first planar refractive component 110 and the second planar refractive component 120 are each arranged in the electromagnetic beam steering structure 250 with their beam receiving faces parallel to each other and normal to the coaxial axis 205.

In an embodiment, the steered electromagnetic beam 236 has direction that is a vector sum of the first deflection angle 134 of the first planar refractive component 110 and the second deflection angle 238 of the second planar refractive component 120. In an embodiment, the electromagnetic beam 130 incident on the first planar refractive component exits the second planar refractive component as a steered electromagnetic beam 236 having a direction (azimuth angle $\theta$ 139 and zenith angle $\phi$ 238) that is a vector sum of the first deflection angle of the first planar refractive component and the second deflection angle of the second planar refractive component. In an embodiment, the steered electromagnetic beam has a controllable tilt at an angle $\phi$ relative to the coaxial axis 205. In an embodiment, the steered electromagnetic beam has a controllable rotation at an azimuth angle $\theta$ about the coaxial axis 205. In an embodiment, the electromagnetic beam steering structure is configured to steer the electromagnetic beam 130 propagating along the coaxial axis normal to the first planar refractive component and the second planar refractive component to an azimuth angle $\theta$ and a zenith angle $\phi$ between zero and a finite angle from the coaxial axis. In an embodiment, the electromagnetic beam steering structure is configured to steer the transmitted deflected electromagnetic beam to a selectable portion of a field of regard. In an embodiment, the electromagnetic beam steering structure is configured to steer the transmitted electromagnetic beam within a continuous range of directions within a field of regard.

In an embodiment, the apparatus 200 includes a beam controller 280 configured to calculate a rotational position of the first planar refractive component 110 about the coaxial axis 205 and a rotational position of the second planar refractive component 120 about the coaxial axis pointing the steered electromagnetic beam 236 at a selected target 295. In an embodiment, the beam controlled may be configured to acquire, track, and point at the selected target.

In an embodiment, the apparatus 200 includes an electromagnetic beam generator 286 configured to transmit the electromagnetic beam to the first planar refractive component 110. In an embodiment, the electromagnetic beam generator includes a radio frequency antenna. In an embodiment, the radio frequency antenna includes a microwave antenna. In an embodiment, the radio frequency antenna includes parabolic reflector, horn with dielectric lens, or slotted waveguide. In an embodiment, the radio frequency antenna includes a slotted waveguide. In an embodiment, the radio frequency antenna includes a holographic planar metamaterial antenna. In an embodiment, the radio frequency antenna includes a horn with a dielectric lens. In an embodiment, the radio frequency antenna includes a patch antenna. In an embodiment, the electromagnetic beam generator includes an optical radiation transmitter. In an embodiment, the electromagnetic beam generator includes an optical radiation receiver. In an embodiment, the electromagnetic beam generator includes an optical radiation transceiver. In an embodiment, the electromagnetic beam generator includes a laser waveguide configured to direct an optical electromagnetic beam at the first planar refractive component.

Various embodiments or variations of the first planar refractive component 110 are described herein. In an embodiment, the second planar refractive component 120 may include one or more of the embodiments or variations described for the first planar refractive component.

Figure 3:
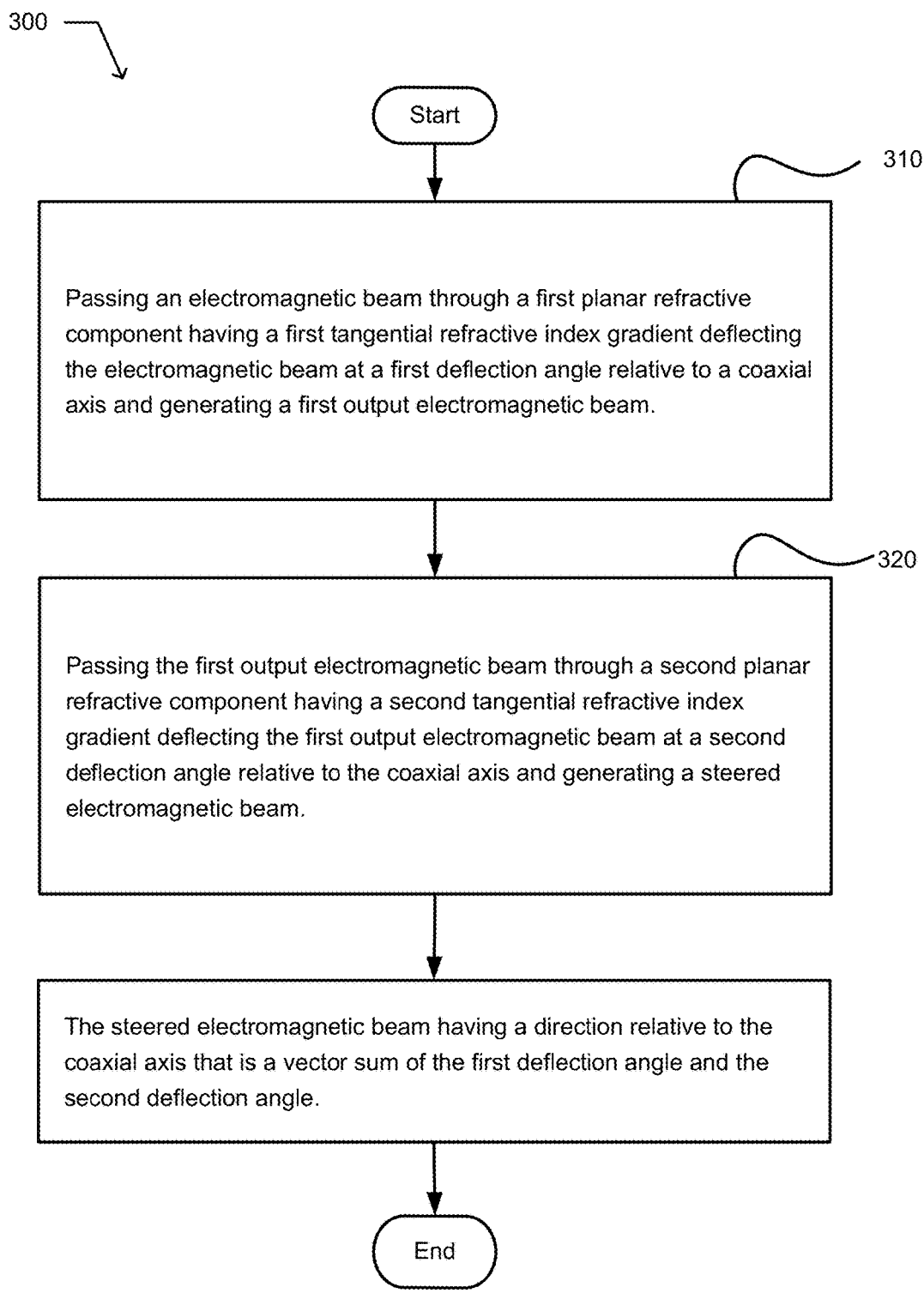
FIG. 3 illustrates an example operational flow.

FIG. 3 illustrates an example operational flow 300. After a start operation, the operational flow includes a first deflecting operation 310. The first deflecting operation includes passing an electromagnetic beam through a first planar refractive component having a first tangential refractive index gradient, deflecting the electromagnetic beam at a first deflection angle relative to a coaxial axis, and generating a first output electromagnetic beam. In an embodiment, the first deflecting operation may be implemented by the electromagnetic beam 130.1 passing through the first planar refractive component 110, being deflected at the first deflection angle 134 relative to the coaxial axis 106, and generating the first output electromagnetic beam, illustrated as the electromagnetic beam 132, as described in conjunction with FIG. 1. In an embodiment, the first deflecting operation may be implemented by the electromagnetic beam 130 passing through the first planar refractive component 110, being deflected at the first deflection angle 134 relative to the coaxial axis 205, and generating the first output electromagnetic beam, illustrated as the electromagnetic beam 232, as described in conjunction with FIG. 2.

A second deflecting operation 320 includes passing the first output electromagnetic beam through a second planar refractive component having a second tangential refractive index gradient, deflecting the first output electromagnetic beam at a second deflection angle relative to the coaxial axis, and generating a steered electromagnetic beam. In an embodiment, the second deflecting operation may be implemented by the first output electromagnetic beam, illustrated as the electromagnetic beam 130.2, passing through the second planar refractive component 120, being deflected at the second deflection angle 138 relative to the coaxial axis 107, and generating a steered electromagnetic beam, illustrated as the electromagnetic beam 136, as described in conjunction with FIG. 1. In an embodiment, the second deflecting operation may be implemented by the first output electromagnetic beam, illustrated as the electromagnetic beam 232 passing through the second planar refractive component 120, being deflected at the second deflection angle 238 relative to the coaxial axis 205, and generating a steered electromagnetic beam, illustrated as the steered electromagnetic beam 236, as described in conjunction with FIG. 2. The steered electromagnetic beam having a direction relative to the coaxial axis that is a vector sum of the first deflection angle 134 and the second deflection angle 238. The operational flow includes an end operation. In an embodiment, the first planar refractive component includes an artificially structured effective media.

In an embodiment, the operational flow 300 includes rotating the first planar refractive component around the coaxial axis to a first selected position, and rotating the second planar refractive component around the coaxial axis to a second selected position. In an embodiment, the steered electromagnetic beam 238 has an azimuth angle θ 139. The azimuth angle describes a rotation about the coaxial axis 205. The steered electromagnetic beam 238 has a zenith angle φ 238. The zenith angle describes a deflection from the coaxial axis between zero and finite angle from the coaxial axis. The azimuth angle θ and the zenith angle φ are responsive to the first deflection angle, the second deflection angle, the first selected position, and the second selected position.

In an embodiment, the operational flow 300 includes a targeting operation. The targeting operation includes receiving information indicative of a position of a target 295, and determining the first selected position and the second selected position pointing the steered electromagnetic beam 230 at the target. In an embodiment, the targeting operation may be implemented using the beam controller 280 described in conjunction with FIG. 2. In an embodiment, the receiving includes receiving information indicative of a position of the target in a three dimensional space.

In an embodiment, the operational flow 300 includes initiating the electromagnetic beam incident on the first planar refractive component. In an embodiment, the initiating may be implemented using the beam generator 286 described in conjunction with FIG. 2.

Figure 4:
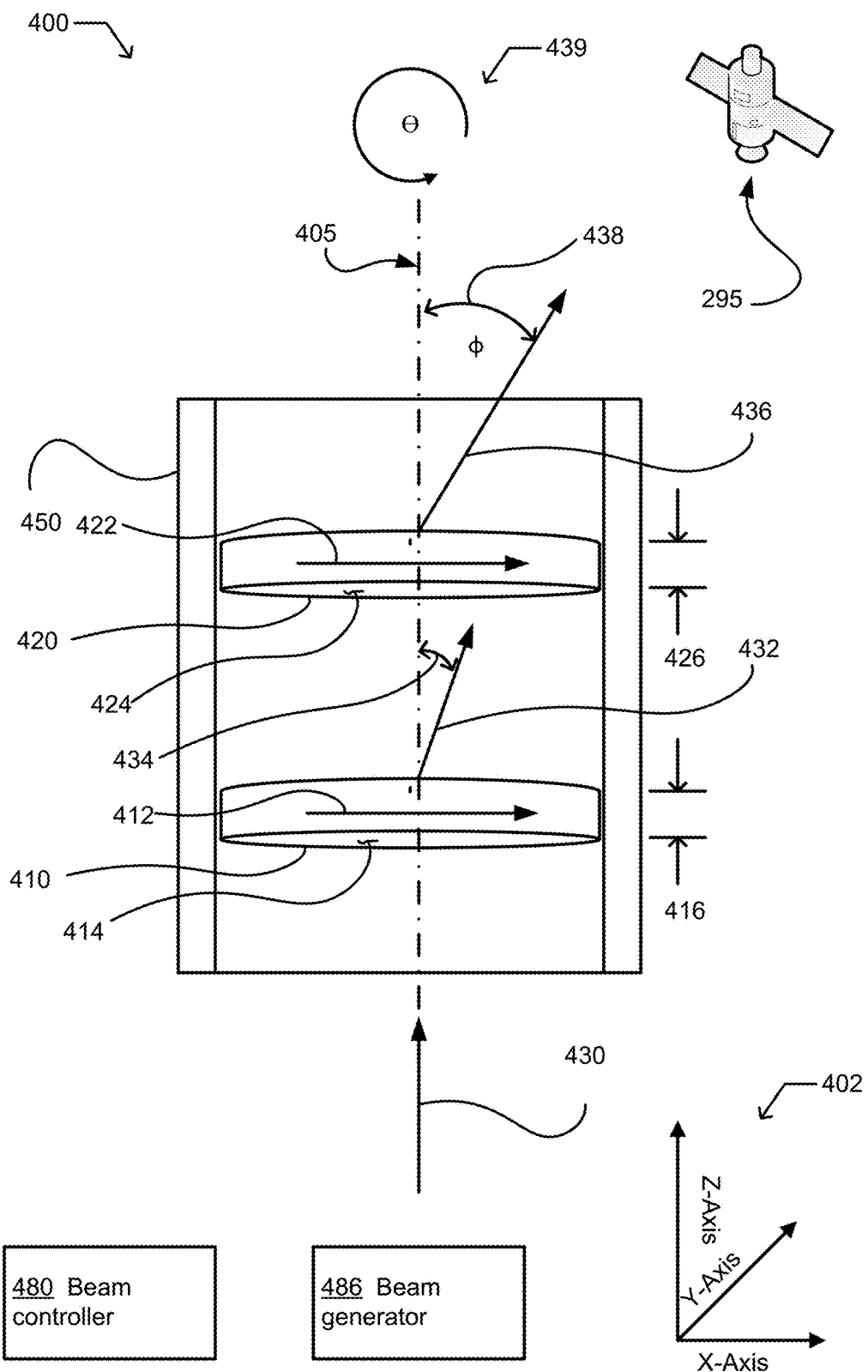
FIG. 4 illustrates an example electromagnetic beam steering apparatus.

FIG. 4 illustrates an example electromagnetic beam steering apparatus 400 and a reference three-dimensional axis 402. The apparatus includes a first planar refractive component 410 having a first tangential piecewise linear refractive index 412 deflecting an electromagnetic beam 430 at a first deflection angle 434 relative to an axis 405 normal (e.g. Z-axis 102) to a major surface 414 of the first planar refractive component. In an embodiment, the first tangential piecewise linear refractive index includes a continuously varying index of refraction. In an embodiment, the first tangential piecewise linear refractive index includes a continuously spatially varying index of refraction. For example, the tangential piecewise linear refractive index may include a non-constant media providing a continuously varying index of refraction. The index is approximated or modeled using piece-piecewise-linear approximations of the non-linear rays. In an embodiment, the first planar component may have a cylindrical shape, a parallelepiped shape, or other shape with substantially parallel major surfaces in the XY plane of axis 402. The apparatus includes a second planar refractive component 420 having a second tangential piecewise linear refractive index 422 deflecting an electromagnetic beam 432 at a second deflection angle 438 relative to an axis 405 normal (e.g. Z-axis 102) to a major surface 424 of the second planar refractive component. In an embodiment, the first deflection angle and the second deflection angle may be substantially similar. The apparatus includes an electromagnetic beam steering structure 450 configured to independently rotate 439 the first planar refractive component and second planar refractive component about the coaxial axis 405 such that the electromagnetic beam 430 incident on the first planar refractive component exits the second planar refractive component as a steered electromagnetic beam, illustrated by the first output electromagnetic beam 432. In an embodiment, the electromagnetic beam steering apparatus may steer an electromagnetic beam in a transmit mode or in a receive mode. For example, in an embodiment, the electromagnetic beam steering structure may function or operate in a Risley prism beam steering manner.

In an embodiment, the electromagnetic beam 430 includes a radiofrequency electromagnetic beam. For example, a radiofrequency electromagnetic beam may include a microwave band radiofrequency electromagnetic beam. For example, a radiofrequency electromagnetic beam may include a 1 GHz to 300 GHz radiofrequency electromagnetic beam. For example, a radiofrequency electromagnetic beam may include a radiofrequency electromagnetic beam with a free space wavelength between 30 cm to 1 mm. In an embodiment, the electromagnetic beam includes a light wavelength electromagnetic beam. For example, a light wavelength electromagnetic beam may include an infrared or a visible light wavelength electromagnetic beam.

In an embodiment, the first planar refractive component 410 includes two opposed generally planar and parallel major surfaces and a thickness 416 that is less than the free-space wavelength of the electromagnetic beam. In an embodiment, a planar surface of the two opposed generally planar and parallel major surfaces has a radius of curvature that is large relative to the thickness. In an embodiment, the radius of curvature is greater than ten times the thickness. In an embodiment, the radius of curvature includes a cylindrical radius of curvature. In an embodiment, a major surface 414 of the first planar refractive component includes a generally or substantially flat major surface. In an embodiment, a receiving or transmitting surface of the first planar refractive component includes an arbitrary surface approximating a flat surface.

In an embodiment, the first planar refractive component 410 and the second planar refractive component 420 each have a thickness (416, 426) less than the free-space wavelength of the incident electromagnetic beam (hereafter free-space subwavelength thickness). In an embodiment, the free-space subwavelength thickness includes a subwavelength thickness of less than one-half of the free-space wavelength of the electromagnetic beam. In an embodiment, the free-space subwavelength thickness includes a subwavelength thickness of less than one-fifth of the free-space wavelength of the electromagnetic beam. In an embodiment, the free-space subwavelength thickness includes a subwavelength thickness of less than one-tenth of the free-space wavelength of the electromagnetic beam. In an embodiment, the piecewise linear refraction index includes a piecewise constant gradient.

In an embodiment, the first piecewise linear refraction index 412 includes a piecewise continuous refraction gradient with discontinuities. In an embodiment, the first piecewise linear refraction index includes a spacewise dependent index of refraction. In an embodiment, the first piecewise linear refraction index includes a periodically repeating refraction index profile. In an embodiment, the first piecewise linear refraction index includes a linearly varying gradient index transverse to the plane of the first planar refractive component.

In an embodiment, the first planar refractive component 410 includes an artificially structured effective media configured to produce the piecewise linear refractive index 412. In an embodiment, the artificially structured effective media includes a composite material. In an embodiment, the artificially structured effective media includes an effective negative permittivity or negative permeability media. In an embodiment, the artificially structured effective media includes artificially structured subwavelength electromagnetic unit cells. In an embodiment, the artificially structured effective media includes artificially structured subwavelength metamaterial unit cells. In an embodiment, the artificially structured effective media includes artificially structured metamaterial surface. In an embodiment, the artificially structured effective media includes artificially structured meta-surface or meta-interface. In an embodiment, the artificially structured meta-surface or meta-interface includes subwavelength components or elements.

In an embodiment, the first planar refractive component 410 includes an artificially structured effective media having electronically-selectable piecewise linear refractive index 412 deflecting the electromagnetic beam 430 at a first selected deflection angle if in a first selected state and a deflecting the electromagnetic beam at a second selected deflection angle if in a second selected state. In an embodiment for example, the first selected state may be an off-state, and the second selected state may be an on-state.

In an embodiment, the major surface 414 of the first planar refractive component 410 includes at least two layers of voxels of artificially structured effective media. Each voxel of the artificially structured effective media having electronically-selectable piecewise linear refractive index gradient 412 deflecting the electromagnetic beam 430 incident on the major surface 414 at a first deflection angle if in a first selected state and deflecting the incident electromagnetic beam at a second deflection angle if in a second selected state. In an embodiment, the voxels of artificially structured effective media may include subwavelength unit cells. In an embodiment, the voxels of artificially structured effective media include a three-dimensional assembly of artificially structured effective media. In an embodiment, each voxel or unit cell has one of two fixed refractive index values, where one value is that of free space and the other value is the range of n=1.3-3. In an embodiment, each voxel or unit cell has one of two different refractive index values.

In an embodiment, the apparatus 400 includes a beam controller 480 configured to calculate a rotational position of the first planar refractive component 410 about the coaxial axis 405 and a rotational position of the second planar refractive component 420 about the coaxial axis pointing the steered electromagnetic beam at the selected target 295. In an embodiment, the beam controller may be configured to acquire, track, and point at the selected target. In an embodiment, the apparatus includes an electromagnetic beam generator 486 configured to transmit the electromagnetic beam.

Various embodiments or variations of the first planar refractive component 410 are described herein. In an embodiment, the second planar refractive component 420 may include one or more of the embodiments or variations described for the first planar refractive component.

Figure 5:
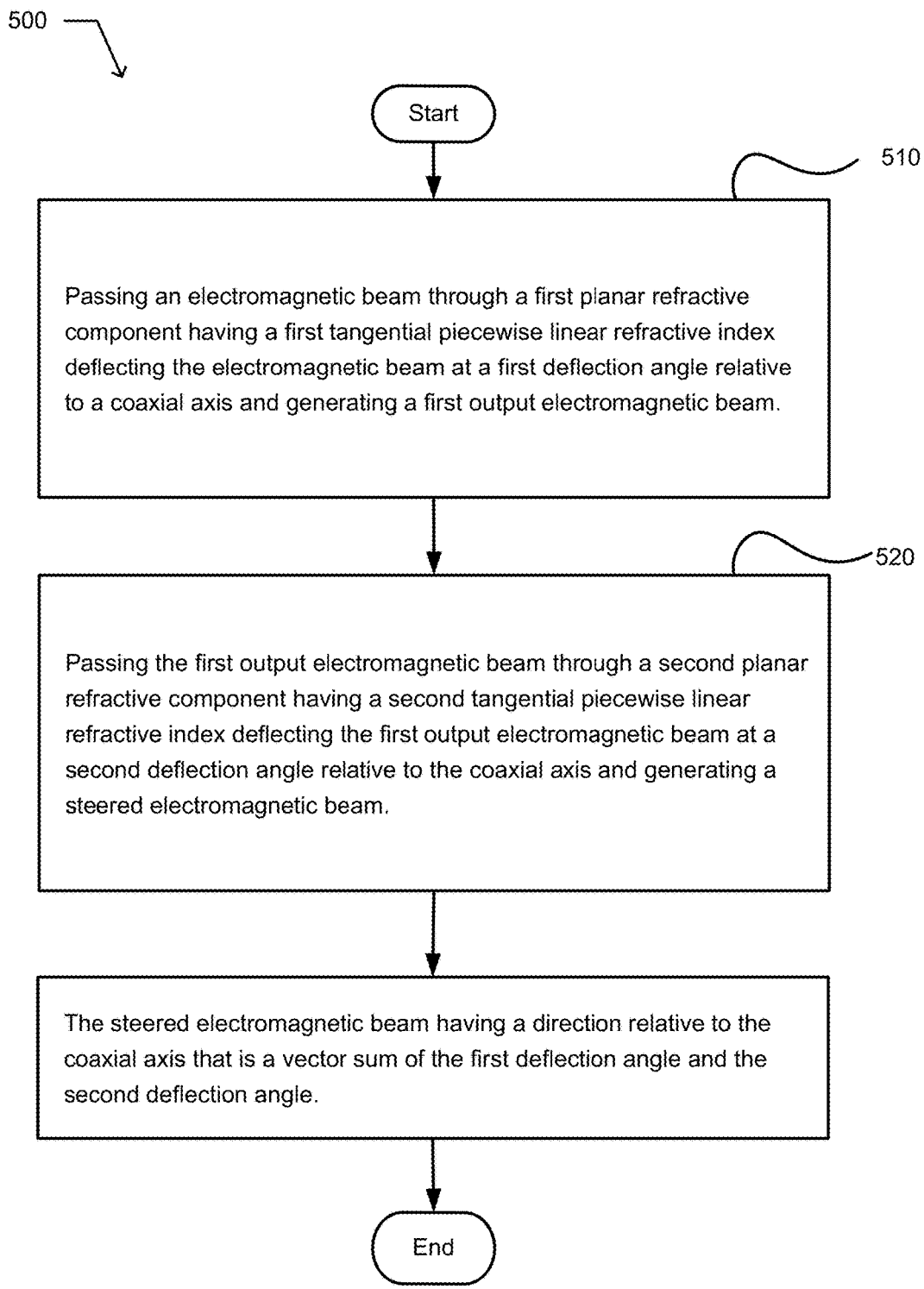
FIG. 5 illustrates an example operational flow.

FIG. 5 illustrates an example operational flow 500. After a start operation, the operational flow includes a first deflecting operation 510. The first deflecting operation includes passing an electromagnetic beam through a first planar refractive component having a first tangential piecewise linear refractive index, deflecting the electromagnetic beam at a first deflection angle relative to a coaxial axis, and generating a first output electromagnetic beam. In an embodiment, the first deflecting operation may be implemented by the electromagnetic beam 430 passing through the first planar refractive component 410 having the first tangential piecewise linear refractive index 412, deflecting the electromagnetic beam at the first deflection angle 434 relative to the coaxial axis 405, and generating the first output electromagnetic beam 432 as described in conjunction with FIG. 4.

A second deflecting operation 520 includes passing the first output electromagnetic beam through a second planar refractive component having a second tangential piecewise linear refractive index, deflecting the first output electromagnetic beam at a second deflection angle relative to the coaxial axis, and generating a steered electromagnetic beam. In an embodiment, the second deflecting operation may be implemented by passing the first output electromagnetic beam 432 through the second planar refractive component 420 having the second tangential piecewise linear refractive index 422, deflecting the first output electromagnetic beam at the second deflection angle 438 relative to the coaxial axis 405, and generating the steered electromagnetic beam 436 as described in conjunction with FIG. 4. The steered electromagnetic beam having a direction relative to the coaxial axis that is a vector sum of the first deflection angle and the second deflection angle. The operational flow includes an end operation. In an embodiment, the first planar refractive component includes an artificially structured effective media.

In an embodiment, the operational flow 500 includes rotating the first planar refractive component around the coaxial axis to a first selected position and rotating the second planar refractive component around the coaxial axis to a second selected position, wherein the steered electromagnetic beam has an azimuth angle $\theta$ and a zenith angle $\phi$ between zero and a finite angle from the coaxial axis. The azimuth angle $\theta$ and the zenith angle $\phi$ are responsive to the first deflection angle, the second deflection angle, the first selected position, and the second selected position. In an embodiment, the operational flow includes receiving information indicative of a position of the target 295, and determining the first selected position and the second selected position pointing the steered electromagnetic beam at the target. In an embodiment, the targeting operation may be implemented using the beam controller 480 described in conjunction with FIG. 4. In an embodiment, the receiving includes receiving information indicative of a position of the target in a three dimensional space. In an embodiment, the operational flow includes initiating the electromagnetic beam incident on the first planar refractive component. In an embodiment, the initiating may be implemented using the beam generator 486 described in conjunction with FIG. 4.

Figure 6:
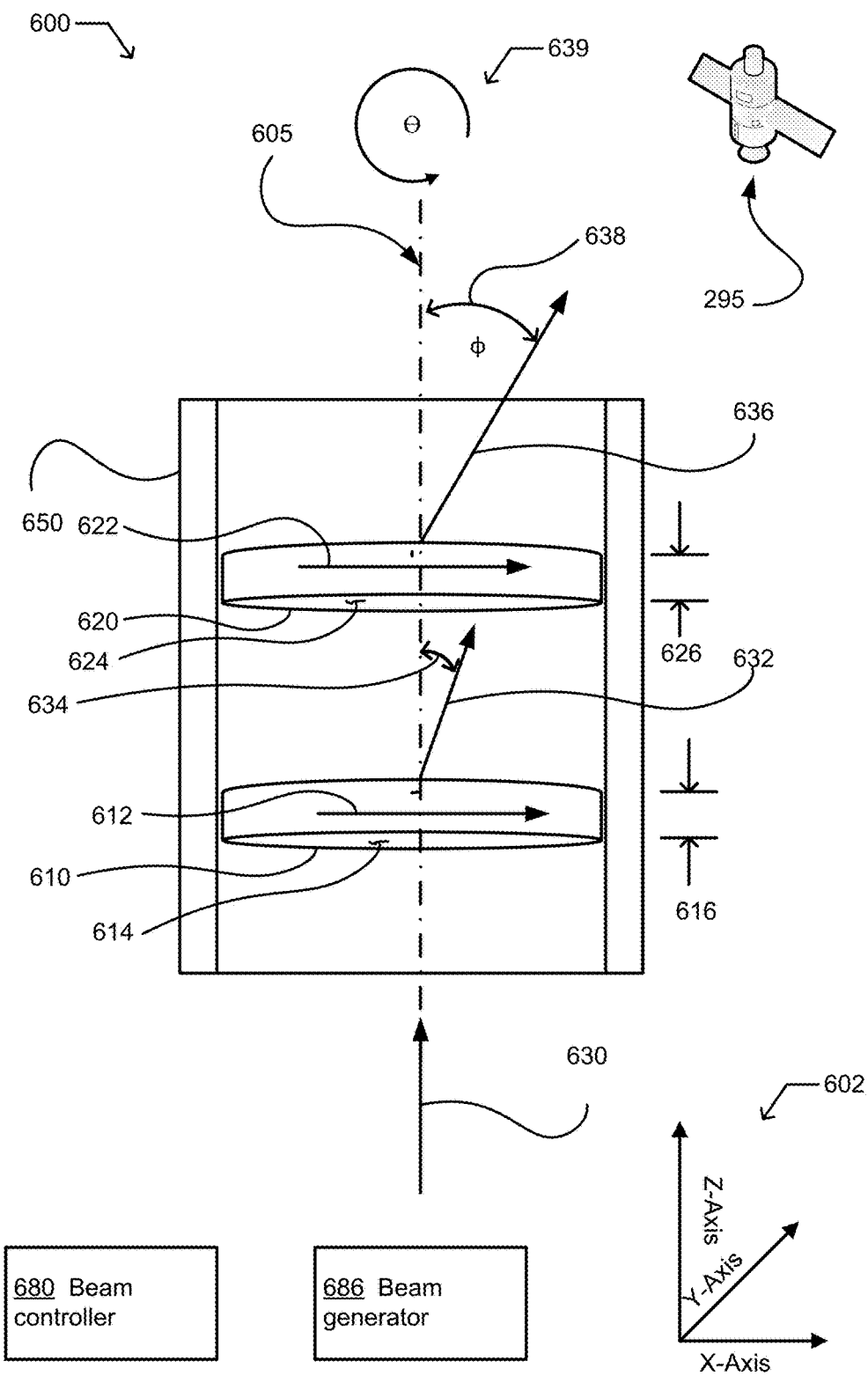
FIG. 6 illustrates an example electromagnetic beam steering apparatus.

FIG. 6 illustrates an example electromagnetic beam steering apparatus 600 and a reference three-dimensional axis 602. The apparatus includes a first blazed transmission diffraction grating component 610 configured to angularly deflect an electromagnetic beam 630 at a first blaze angle

634. The apparatus includes a second blazed transmission diffraction grating component 620 configured to angularly deflect an electromagnetic beam, illustrates as the transmitted electromagnetic beam 632, at a second blaze angle 638. The apparatus includes an electromagnetic beam steering structure 650 configured to independently rotate the first blazed transmission diffraction grating component and the second blazed transmission diffraction grating component about a coaxial axis 605 such that the electromagnetic beam 630 incident on the first blazed transmission diffraction grating component exits the second blazed transmission diffraction grating component as a steered electromagnetic beam, illustrated by the second output electromagnetic beam 636. In an embodiment, the electromagnetic beam steering apparatus may steer an electromagnetic beam in a transmit mode or in a receive mode. For example, in an embodiment, the electromagnetic beam steering structure may function or operate in a Risley prism beam steering manner.

In an embodiment, a diffraction grating (612 or 622) is a collection of transmitting elements separated by a distance comparable to the wavelength of the electromagnetic beam 630. A diffraction grating may be thought of as a collection of diffracting elements, such as a pattern of transparent slits or apertures in an opaque screen, or a collection of reflecting grooves on a substrate. A fundamental physical characteristic of a diffraction grating is a spatial modulation of the refractive index. Upon diffraction, an electromagnetic beam incident on a grating will have its electric field amplitude, or phase, or both, modified in a predictable manner due to the periodic variation in refractive index in the region near the surface of the grating. In an embodiment, the diffractive behavior operates by a constructive interference of electromagnetic waves transmitted through an amplitude or phase mask. In an embodiment, a reflection grating consists of a grating superimposed on a reflective surface, and a transmission grating consists of a grating superimposed on a transparent surface.

In an embodiment of a blazed transmission grating (612 or 622) nearly all of the diffracted or refracted electromagnetic energy is selectively concentrated in a specific angular range, which is referred to as a blaze angle. A blaze angle is a concentrated or efficient deflection of nearly all the diffracted beam energy by a blazed transmission grating within or at a particular angle, e.g., the blaze angle. Diffraction gratings can be optimized such that most of the power goes into a certain diffraction order, leading to a high diffraction efficiency for that order. This optimization leads to position-dependent phase changes described by a sawtooth-like function (with linear increases followed by sudden steps). The slope of the corresponding surface profile is optimized for the given conditions in terms of input angle and wavelength.

In an embodiment, a blazed transmission grating deflects a desired diffraction order and suppresses other diffraction orders. In an embodiment of a blazed transmission grating most of the transmitted beam will be diffracted in either the zero-order or a first order. The direction in which maximum efficiency is achieved is called the blaze angle and is the third crucial characteristic of a blazed grating directly depending on blaze wavelength and diffraction order. In an embodiment, a blazed transmission grating is optimized to achieve maximum grating efficiency in a selected diffraction order. In an embodiment, a blazed transmission grating may be implemented by a ruled grating, a holographic grating, or an efficient media grating. The blaze angle of a transmission grating is not the same as a groove angle of a ruled grating.

In an embodiment, the electromagnetic beam 630 includes a radiofrequency electromagnetic beam. For example, a radiofrequency electromagnetic beam may include a microwave band radiofrequency electromagnetic beam. For example, a radiofrequency electromagnetic beam may include a 1 GHz to 300 GHz radiofrequency electromagnetic beam. For example, a radiofrequency electromagnetic beam may include a radiofrequency electromagnetic beam with a free space wavelength between 30 cm to 1 mm. In an embodiment, the electromagnetic beam includes a light wavelength electromagnetic beam. For example, a light wavelength electromagnetic beam may include an infrared or a visible light wavelength electromagnetic beam.

In an embodiment, the first blazed transmission diffraction grating component 610 includes two opposed generally planar and parallel major surfaces and a thickness 616 that is less than the free-space wavelength of the electromagnetic beam 630. In an embodiment, a planar surface of the two opposed generally planar and parallel major surfaces has a radius of curvature that is large relative to the thickness. In an embodiment, the radius of curvature is greater than ten times the thickness. In an embodiment, the radius of curvature includes a cylindrical radius of curvature. In an embodiment, a major surface 614 of the first blazed transmission diffraction grating component 610 includes a generally or substantially flat major surface. In an embodiment, a receiving or transmitting surface of the first blazed transmission diffraction grating component 610 includes an arbitrary surface approximating a flat surface.

In an embodiment, the first blazed transmission diffraction grating component 610 includes a first planar blazed transmission diffraction grating. In an embodiment, the second blazed transmission diffraction grating component 620 includes a second planar blazed transmission diffraction grating. In an embodiment, the first blazed transmission diffraction grating component and the second blazed transmission diffraction grating component each have a thickness (616, 626) less than the free-space wavelength of the incident electromagnetic beam 630 (hereafter free-space sub-wavelength thickness). In an embodiment, the free-space subwavelength thickness includes a subwavelength thickness of less than one-half of the free-space wavelength of the electromagnetic beam. In an embodiment, the free-space subwavelength thickness includes a subwavelength thickness of less than one-fifth of the free-space wavelength of the electromagnetic beam. In an embodiment, the free-space subwavelength thickness includes a subwavelength thickness of less than one-tenth of the free-space wavelength of the electromagnetic beam.

In an embodiment, the first blazed transmission diffraction grating component 610 and the second blazed transmission diffraction grating component 620 are each selected to angularly deflect in combination the incident electromagnetic beam 630 at blaze angles optimized for electromagnetic beam steering. In an embodiment, the first transmission diffraction grating component is optimized to maximize the transmitted electromagnetic beam 632 energy at the first blaze angle 634 for electromagnetic beam steering while minimizing the total transmitted electromagnetic beam energy at the zeroth-order (the unwanted bore sight beam) and other unwanted orders of the diffracted beam to less than fifty-percent of the electromagnetic beam energy transmitted at the blaze angle. For example, the minimizing includes suppression of +1 order transmitted beam when using −1 order transmitted beam as a "main lobe." In an embodiment, the total transmitted electromagnetic beam energy at the zeroth-order and other unwanted orders of the diffracted beam are minimized to less than thirty-percent of the electromagnetic beam energy transmitted at the blaze angle. In an embodiment, the first transmission diffraction grating component is optimized so that nearly all the diffracted transmitted beam energy is concentrated in a particular angle, the first blaze angle. In an embodiment, the first blaze angle is selected to optimize the transmitted electromagnetic beam 632 energy. In an embodiment, the first blaze angle is selected to maximize the transmitted electromagnetic beam 632 energy with a principal intensity maximum at the first blaze angle and minimize the total transmitted electromagnetic beam energy at the zeroth-order and other unwanted orders of the diffracted electromagnetic beam. In an embodiment, the first blaze angle and the second blaze angle are each selected to maximize in combination the transmitted energy of the steered electromagnetic beam 636 with a principal intensity maximum at the second blaze angle 638 and minimize the total transmitted electromagnetic beam energy at the zeroth-order and other unwanted orders of the transmitted electromagnetic beam.

In an embodiment, a characteristic of the first blazed transmission diffraction grating component 610 is selected to maximize the transmitted electromagnetic beam 632 energy at the first blaze angle 634 while minimizing the total transmitted electromagnetic beam energy at the zeroth-order and other unwanted orders of the diffracted beam to less than fifty-percent of the electromagnetic beam energy transmitted at the first blaze angle. For example, the characteristic may include a shape or a spacing of a grating of the first blazed transmission diffraction component. In an embodiment, the selected characteristic of the first blazed transmission diffraction grating component includes a selected periodicity of diffracting elements of the first blazed transmission diffraction grating component. In an embodiment, the first blaze angle 634 of the first blazed transmission diffraction grating component 610 is selectable by choosing a periodicity of the first blazed transmission grating. In an embodiment, the periodicity of the first blazed transmission grating is established by switching or tuning the periodicity of a dynamic grating.

In an embodiment, the first blazed transmission diffraction grating component 610 includes a first graded-index or a gradient-index blazed transmission diffraction grating. In an embodiment, the first blazed transmission diffraction grating component includes a first strongly asymmetrically shaped refractive index map within one period of the first grating component. In an embodiment, the first blazed diffraction grating transmission component includes a one-dimensional blazed transmission diffraction grating. For example, a one-dimensional blazed transmission diffraction grating may include a structural uniformity in a first dimension and no structural uniformity in a second orthogonal dimension, such as a periodic media. In an embodiment, the first blazed diffraction grating transmission component includes a two-dimensional blazed transmission diffraction grating. In an embodiment, the first blazed diffraction grating transmission component includes a three-dimensional blazed transmission diffraction grating.

In an embodiment, the first blazed transmission diffraction grating component 610 includes a first blazed transmission diffraction grating formed by parallel grooves on a substrate. For example, the parallel grooves may include ruled or laser interference patterns. In an embodiment, the parallel grooves include rectangular-profile parallel grooves. In an embodiment, the first blazed transmission diffraction grating component includes a first blazed transmission diffraction grating formed by wires on a substrate. In an embodiment, the first blazed transmission diffraction grating component includes a first holographic transmission diffraction grating.

In an embodiment, the first blazed transmission diffraction grating component 610 includes a first linearly varying graded index diffraction transmission grating configured to angularly deflect an electromagnetic beam at the first blaze angle 634. In an embodiment, the first linearly varying graded index diffraction transmission grating includes a first optimized linearly varying transverse index profile over a periodically repeated one-dimensional cell configured to angularly deflect the incident electromagnetic beam at a selected first blaze angle. For example, a simple linear saw tooth profile may not have the best possible gain or side lobe level. Optimization of the transverse index profile over a periodically repeated one-dimensional cell addresses these problems, and it would typically use the simple linear saw tooth as an "initial informed guess" starting point.

In an embodiment, the first blazed transmission diffraction grating component 610 includes a first blazed transmission diffraction grating formed by an artificially structured effective media producing or behaving as a periodically varying refractive index deflecting the electromagnetic beam 630 at the first blaze angle 634. For example, the periodically varying refractive index allows the scattered wave front to be specified essentially at will. For example, the resonant nature of subwavelength resonators and unit cells introduces the abrupt phase shifts, or abrupt changes phase, amplitude, or polarization. In an embodiment, the periodically varying refractive index includes a periodically varying refractive index producing an abrupt phase, amplitude, or polarization shift over a scale of a wavelength of the electromagnetic beam. In an embodiment, the phase shift is a function of a position along the interface. In an embodiment, the phase shift is a function of abrupt phase changes in the electromagnetic beam path over the scale of a wavelength. In an embodiment, the periodically varying refractive index includes a periodically varying refractive index producing a phase discontinuity in the electromagnetic beam. For example, a discontinuous phase blazed transmission diffraction grating. In an embodiment, the artificially structured effective media includes an artificially structured subwavelength effective media configured to produce the periodically varying refractive index. In an embodiment, the artificially structured effective media includes a negative permittivity or negative permeability media configured to produce the periodically varying refractive index. In an embodiment, the artificially structured effective media includes artificially structured subwavelength electromagnetic unit cells configured to produce the periodically varying refractive index. In an embodiment, the artificially structured effective media includes artificially structured subwavelength metamaterial unit cells configured to produce the periodically varying refractive index. In an embodiment, the artificially structured effective media includes an artificially structured meta-surface or meta-interface having a subwavelength unit structure and configured to produce the periodically varying refractive index. In an embodiment, the artificially structured effective media includes a metamaterial surface configured to produce the periodically varying refractive index. In an embodiment, the artificially structured effective media includes a meta-surface, or meta-interface configured to produce the periodically varying refractive index. In an embodiment, the artificially structured effective media includes artificially structured metamaterial components having a periodically repeating gradient profile configured to produce the periodically varying refractive index. In an embodiment, the artificially structured effective media includes at least two metamaterial components arranged to produce the periodically varying refractive index.

In an embodiment, the first blazed transmission diffraction grating component 610 and the second blazed transmission diffraction grating component 620 each respectively include a substrate transparent to the electromagnetic beam 630. In an embodiment, the first blazed transmission diffraction grating component and the second blazed transmission diffraction grating component each respectively include a substrate stretchable along a coaxial axis (X-axis or Y-axis) normal to an axis of the grating. For example, a stretchable substrate is expected to produce a tunable refractive index to suppress the zero order or another order of the diffraction across a range of wavelengths.

In an embodiment, the first blazed transmission diffraction grating component 610 includes a first blazed transmission diffraction grating having a periodic or modified periodic variation in the refractive index. In an embodiment, the first blazed transmission diffraction grating having a periodic or modified periodic variation in the refractive index includes an artificially structured effective media presenting a two-dimensional or a three-dimensional grating to the electromagnetic beam 630. In an embodiment, the first blazed transmission diffraction grating having a periodic or modified periodic variation in the refractive index includes an optimized artificially structured effective media presenting two-dimensional pixels to the electromagnetic wave. In an embodiment, the first blazed transmission diffraction grating having a periodic or modified periodic variation in the refractive index includes an optimized artificially structured effective media presenting three-dimensional voxels to the electromagnetic wave. Examples of artificially structured effective media are described in P. Herman, et al., U.S. Pub. Pat. App. 2012/0039567.

In an embodiment, the first blazed transmission diffraction grating component 610 includes a first achromatic blazed transmission diffraction grating component and the second blazed transmission diffraction grating component 620 includes a second achromatic blazed transmission diffraction grating component. Each grating component having a respective tangential refractive index gradient deflecting the electromagnetic beam 630 at a respective blaze angle over a finite range of wavelengths. For example, a finite range of wavelengths includes a discrete set of wavelengths. In an embodiment, the first achromatic blazed transmission component produces an anomalous dispersion of the electromagnetic beam at the blaze angle over a first finite range of wavelengths. For example, the first achromatic blazed transmission component may produce a dispersive phase compensation cancelling the wavelength dependence of the diffraction phenomena with complementary dispersion. In an embodiment, the first achromatic blazed transmission component includes a planar refractive component and an amplitude or phase grating combined to form a single achromatic component. In an embodiment, the first achromatic blazed transmission component includes a negatively sloped refractive index as a function of frequency (dn/df<0). In an embodiment, the first achromatic blazed transmission component includes an artificial media having a negatively sloped refractive index as a function of frequency (dn/df<0). In an embodiment, the first achromatic blazed transmission component includes a first achromatic blazed transmission component having effective negative permittivity or negative permeability media achromatically diffracting an electromagnetic beam at the first blaze angle over a finite range of wavelengths. In an embodiment, the first achromatic blazed transmission component includes a first achromatic blazed transmission component having an effective negative permittivity or negative permeability media achromatically diffracting an electromagnetic beam at the first blaze angle over a finite range of wavelengths. In an embodiment, the first achromatic blazed transmission component includes a composite of subwavelength materials having an effective negative permittivity or negative permeability diffracting an electromagnetic beam at the first blaze angle over a finite range of wavelengths. In an embodiment, the composite of subwavelength materials includes at least one subwavelength resonator. In an embodiment, the at least one subwavelength resonator includes at least one metamaterial unit cell. In an embodiment, the composite of subwavelength materials includes at least one deeply subwavelength element. In an embodiment, the composite of subwavelength materials includes at least two subwavelength components having different electromagnetic beam dispersion characteristics. In an embodiment, the composite of subwavelength materials includes at least three subwavelength components having a varying spacing.

In an embodiment, the first blazed transmission diffraction grating component 610 includes an artificially structured effective media having an electronically-selectable blaze angle 634 deflecting the electromagnetic beam 630 at a first blaze angle if in a first state and a deflecting the electromagnetic beam at a second blaze angle if in a second state. For example, the artificially structured effective media may include a binary media. In an embodiment, the first state is an "off-state" and the second state is an "on-state." In an alternative embodiment, the artificially structured effective media may be a composite structure having a first grating subcomponent having a first blaze gradient deflecting the electromagnetic beam at a first blaze angle and a second grating subcomponent having the electronically selectable second refractive gradient. This composite structure provides two different selectable tangential refractive index gradients.

In an embodiment, the electromagnetic beam steering structure 650 includes an electronically controlled electromagnetic beam steering structure. In an embodiment, the electromagnetic beam steering structure is configured to independently rotate or counter rotate the first blazed transmission diffraction grating component 610 and the second blazed transmission diffraction grating component relative to the coaxial axis 605. In an embodiment, the electromagnetic beam steering structure is configured to rotate the first blazed transmission diffraction grating component and the second blazed transmission diffraction grating component about the coaxial axis while maintaining an electromagnetic beam path or alignment through the first blazed transmission diffraction grating component and the second blazed transmission diffraction grating component.

In an embodiment, the steered electromagnetic beam 636 has direction that is a vector sum of the first blaze angle 634 of the first blazed transmission diffraction grating component 610 and the second blaze angle 638 of the second blazed transmission diffraction grating component 620. In an embodiment, the electromagnetic beam 630 incident on the first blazed transmission diffraction grating component exits the second blazed transmission diffraction grating component as the steered electromagnetic beam 636 having a direction (azimuth angle θ 639 and zenith angle φ, illustrated by the second deflection angle 638) that is a vector sum of the first deflection angle of the first blazed transmission diffraction grating component and the second deflection angle of the second blazed transmission diffraction grating component. In an embodiment, the steered electromagnetic beam has a controllable tilt at an angle φ relative to the coaxial axis. In an embodiment, the steered electromagnetic beam has a controllable rotation at an azimuth angle θ about the coaxial axis 605. In an embodiment, the electromagnetic beam steering structure is configured to steer the electromagnetic beam 630 propagating along the coaxial axis normal to the first blazed transmission diffraction grating component and the second blazed transmission diffraction grating component to an azimuth angle θ and a zenith angle φ between zero and a finite angle from the coaxial axis. In an embodiment, the electromagnetic beam steering structure is configured to steer the electromagnetic beam to a selectable portion of a field of regard. In an embodiment, the electromagnetic beam steering structure is configured to steer the electromagnetic beam within a continuous range of directions within a field of regard.

In an embodiment, the apparatus 600 includes a beam controller 680 configured to calculate a rotational position of the first blazed transmission diffraction grating 610 component about the coaxial axis 605 and a rotational position of the second blazed transmission diffraction grating component 620 pointing the steered electromagnetic beam 636 at the selected target 295. In an embodiment, the apparatus 600 includes an electromagnetic beam generator 686 configured to transmit the electromagnetic beam 630.

Various embodiments or variations of the first blazed transmission diffraction grating component 610 are described herein. In an embodiment, the second blazed transmission diffraction grating component 620 may include one or more of the embodiments or variations described for the first planar refractive component. For example, the second blazed transmission grating may include a major surface 624.

Figure 7:
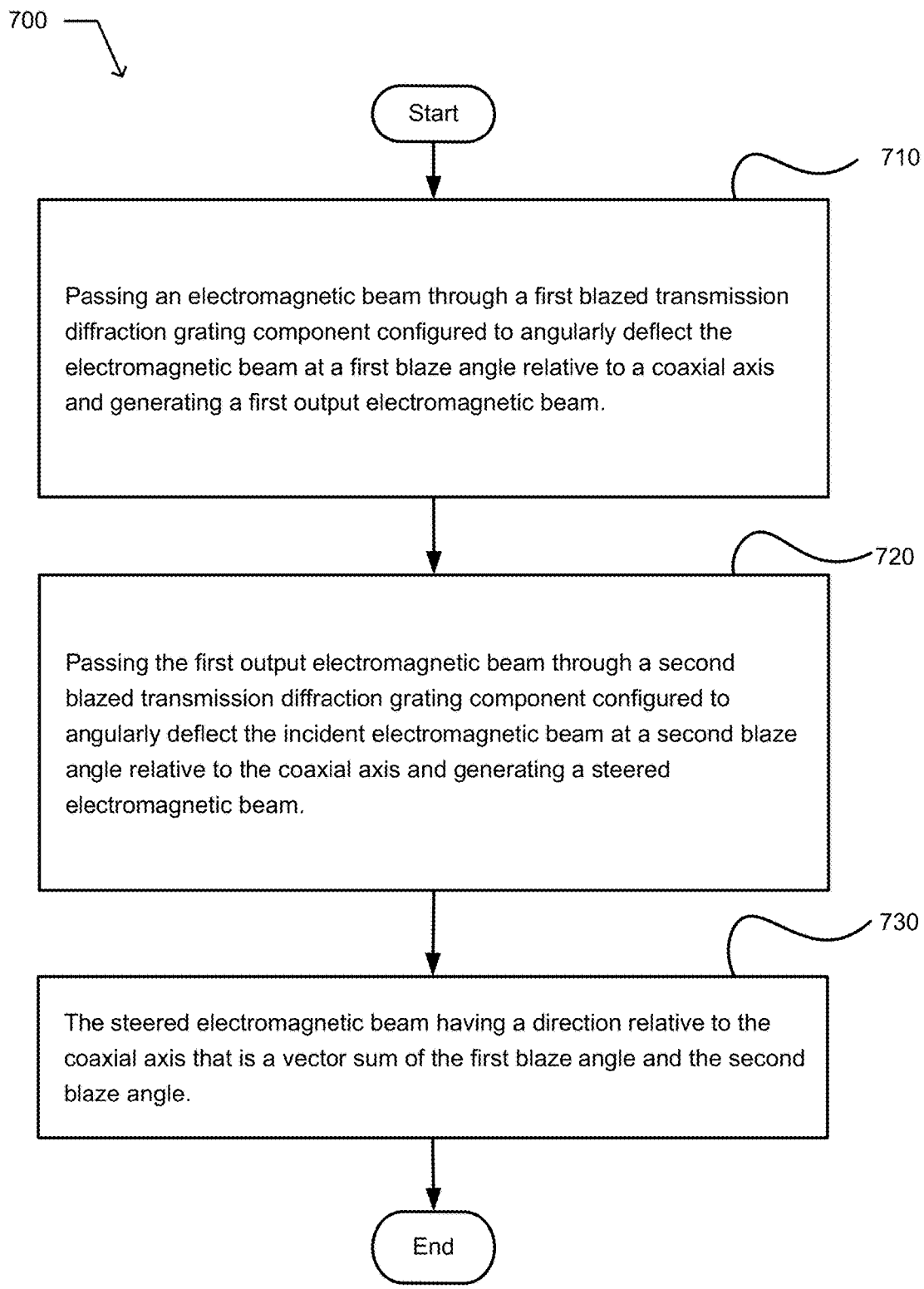
FIG. 7 illustrates an example operational flow.

FIG. 7 illustrates an example operational flow 700. After a start operation, the operational flow includes a first deflecting operation 710. The first deflecting operation includes passing an electromagnetic beam through a first blazed transmission diffraction grating component configured to angularly deflect the electromagnetic beam at a first blaze angle relative to a coaxial axis, and generating a first output electromagnetic beam. In an embodiment, the first deflecting operation may be implemented by passing the electromagnetic beam 630 through the first blazed transmission diffraction grating component 610 configured to angularly deflect the electromagnetic beam at the first blaze angle 634 relative to the coaxial axis 605, and generating a first output electromagnetic beam 632 described in conjunction with FIG. 6. A second deflecting operation 720 includes passing the first output electromagnetic beam through a second blazed transmission diffraction grating component configured to angularly deflect the first output electromagnetic beam at a second blaze angle relative to the coaxial axis and generating a steered electromagnetic beam. In an embodiment, the second deflecting operation may be implemented by passing the first output electromagnetic beam 632 through the second blazed transmission diffraction grating component 620 configured to angularly deflect the first output electromagnetic beam at the second blaze angle 638 relative to the coaxial axis 605 and generate the steered electromagnetic beam 436 described in conjunction with FIG. 6. The steered electromagnetic beam having a direction relative to the coaxial axis that is a vector sum of the first blaze angle and the second blaze angle. The operational flow includes an end operation. In an embodiment, the first blazed transmission diffraction grating component includes an artificially structured effective media configured to angularly deflect an incident electromagnetic beam at a first blaze angle.

In an embodiment, the operational flow 700 includes rotating the first blazed transmission diffraction grating component around the coaxial axis to a first selected position, and rotating the second blazed transmission diffraction grating component around the coaxial axis to a second selected position. The steered electromagnetic beam has an azimuth angle θ (rotation about the coaxial axis) and a zenith angle φ (deflection from the coaxial axis) between zero and a finite angle from the coaxial axis. The azimuth angle θ and the zenith angle φ are responsive to the first blaze angle, the second blaze angle, the first selected position, and the second selected position. In an embodiment, the operational flow includes receiving information indicative of a position of a target in a three dimensional space, and determining the first selected position and the second selected position pointing the steered electromagnetic beam at the target. In an embodiment, the operational flow includes initiating the electromagnetic beam incident on the first blazed transmission diffraction grating component.

Figure 8:
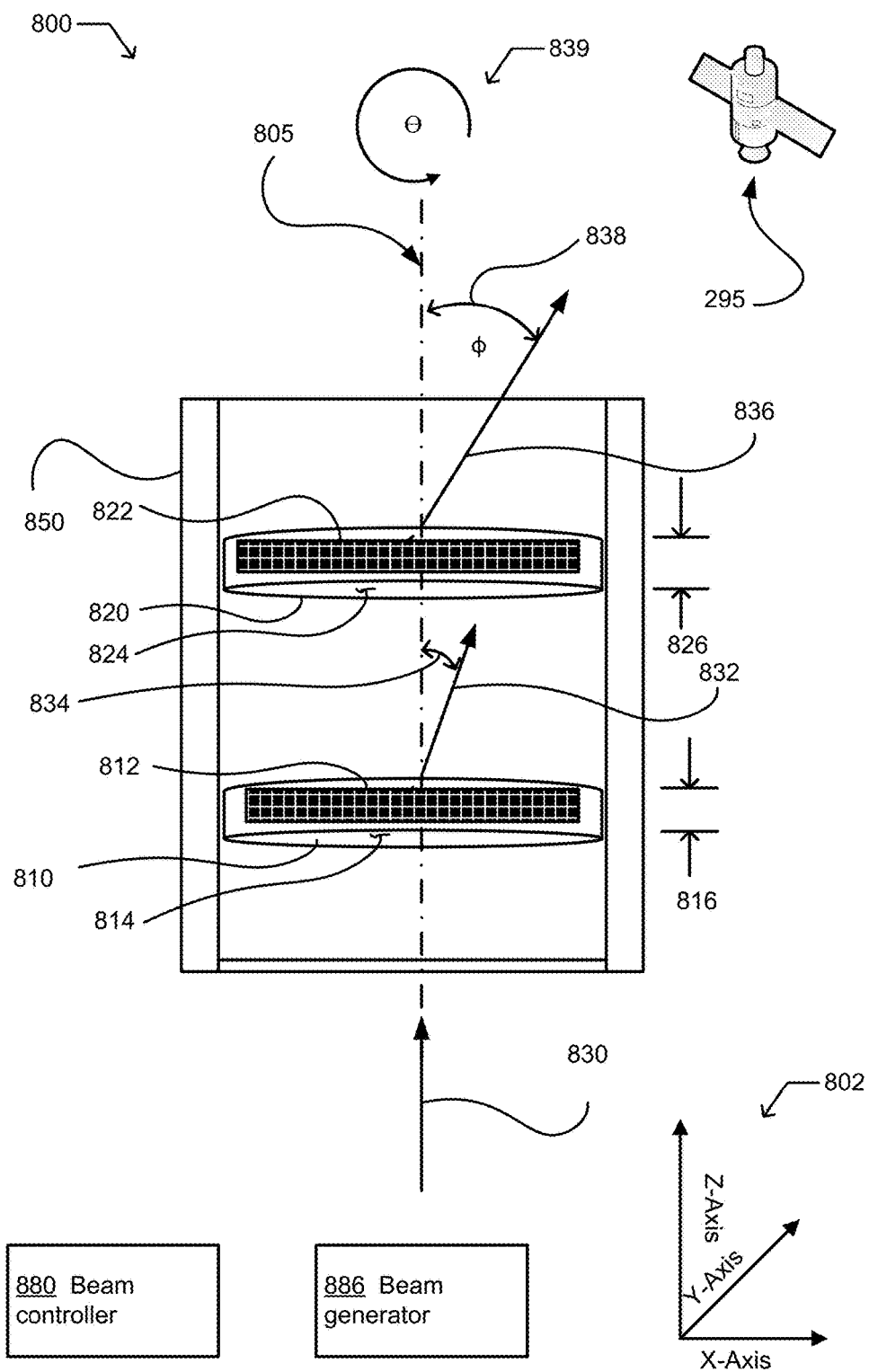
FIG. 8 illustrates an example electromagnetic beam steering apparatus.

FIG. 8 illustrates an example electromagnetic beam steering apparatus 800 and a reference three-dimensional axis 802. The electromagnetic beam steering apparatus includes a first blazed transmission diffraction grating component 810 having a first volumetric distribution of dielectric constants 812 configured to angularly deflect an electromagnetic beam 830 at a first blaze angle 834. The electromagnetic beam steering apparatus includes a second blazed transmission diffraction grating component 820 having a second volumetric distribution of dielectric constants 822 configured to angularly deflect electromagnetic beam 832 at a second blaze angle 838. The electromagnetic beam steering apparatus includes an electromagnetic beam steering structure configured to independently rotate the first blazed transmission diffraction grating component and the second blazed transmission diffraction grating component about a coaxial axis 805 such that an electromagnetic beam 830 incident on the first blazed transmission diffraction grating component exits the second blazed transmission diffraction grating component as a steered electromagnetic beam 836.

In an embodiment, the first volumetric distribution of dielectric constants 812 is divided into a plurality of sub-wavelength voxels having a maximum dimension of less than half of a wavelength of the electromagnetic beam, and each voxel is assigned one of a plurality of dielectric constants to approximate the first volumetric distribution of dielectric constants. In an embodiment, the first volumetric distribution of dielectric constants is approximated using one or more discrete materials having specific dielectric constants. In an embodiment, the second volumetric distribution of dielectric constants 822 is divided into a plurality of sub-wavelength voxels having a maximum dimension of less than half of a wavelength of the electromagnetic beam, and each voxel is assigned one of a plurality of dielectric constants to approximate the second volumetric distribution of dielectric constants. In an embodiment, the second volumetric distribution of dielectric constants is approximated using one or more discrete materials having specific dielectric constants.

In an embodiment, the first blazed transmission diffraction grating component 810 and the second blazed transmission diffraction grating component 820 have substantially similar volumetric distribution of dielectric constants. In an embodiment, the first blazed transmission diffraction grating component and the second blazed transmission diffraction grating component have dissimilar volumetric distributions of dielectric constants.

In an embodiment, the first volumetric distribution of dielectric constants 812 is selected based on an equation for a holographic solution. In an embodiment, the first volumetric distribution of dielectric constants is selected using an optimization algorithm in which the dielectric constants are treated as optimizable variables. In an embodiment, the dielectric constants are binary (0, 1). For example, binary dielectric constants are easier to three-dimensionally print. In an embodiment, the dielectric constants are a quasi-continuous gray scale with a range from a minimum to a maximum value, for example 1-10. A goal in optimizing the first volumetric distribution of dielectric constants is to minimize a deviation between a goal or desired first blaze angle and an achievable or actual blaze angle. In an embodiment, standard optimization techniques may be used. For example, least squares methodology may be used to minimize a deviation between a goal or desired first blaze angle and an achievable or actual first blaze angle. In an embodiment, the real and imaginary parts of the dielectric constants are treated as individually optimizable variables. In an embodiment, the optimization algorithm includes modifying at least one optimizable variable and determining a cost function for the modification. In an embodiment, the optimization algorithm includes determining a gradient of the cost function based on its partial derivatives with respect to each of the optimizable variables. In an embodiment, the optimization algorithm includes determining a sensitivity vector of a given configuration using an adjoint sensitivity algorithm. In an embodiment, the optimization algorithm comprises a constrained optimization algorithm in which the dielectric constants are treated as optimization variables constrained to have real parts greater than or equal to approximately one and imaginary parts equal to or approximately zero. In an embodiment, the optimization algorithm includes starting with an initial guess corresponding to a solution. Example optimization algorithms are described in U.S. patent application Ser. No. 14/638,961, entitled HOLOGRAPHIC MODE CONVERSION FOR ELECTROMAGNETIC RADIATION, naming Tom Driscoll et al. as inventors, filed Mar. 4, 2015.

In an embodiment, the first blazed transmission diffraction grating component 810 includes two opposed generally planar and parallel major surfaces and a thickness 816 that is less than the free-space wavelength of the electromagnetic beam 830. In an embodiment, a planar surface of the two opposed generally planar and parallel major surfaces has a radius of curvature that is large relative to the thickness. In an embodiment, the radius of curvature is greater than ten times the thickness. In an embodiment, the radius of curvature includes a cylindrical radius of curvature. In an embodiment, a major surface 814 of the first blazed transmission diffraction grating component 810 includes a generally or substantially flat major surface. In an embodiment, a receiving or transmitting surface of the first blazed transmission diffraction grating component 810 includes an arbitrary surface approximating a flat surface.

In an embodiment, the first blazed transmission diffraction grating component 810 includes a first planar blazed transmission diffraction grating. In an embodiment, the second blazed transmission diffraction grating component 820 includes a second planar blazed transmission diffraction grating. In an embodiment, the first blazed transmission diffraction grating component and the second blazed transmission diffraction grating component each have a thickness (816, 826) less than the free-space wavelength of the incident electromagnetic beam 830 (hereafter free-space subwavelength thickness). In an embodiment, the free-space subwavelength thickness includes a subwavelength thickness of less than one-half of the free-space wavelength of the electromagnetic beam. In an embodiment, the free-space subwavelength thickness includes a subwavelength thickness of less than one-fifth of the free-space wavelength of the electromagnetic beam. In an embodiment, the free-space subwavelength thickness includes a subwavelength thickness of less than one-tenth of the free-space wavelength of the electromagnetic beam.

In an embodiment, the electromagnetic beam steering structure 850 includes an electronically controlled electromagnetic beam steering structure. In an embodiment, the electromagnetic beam steering structure is configured to independently rotate or counter rotate the first blazed transmission diffraction grating component 810 and the second blazed transmission diffraction grating component 820 relative to the coaxial axis. In an embodiment, the electromagnetic beam steering structure is configured to rotate the first blazed transmission diffraction grating component and the second blazed transmission diffraction grating component about the coaxial axis 805 while maintaining an electromagnetic beam path or alignment through the first blazed transmission diffraction grating component and the second blazed transmission diffraction grating component.

In an embodiment, the steered electromagnetic beam 836 has direction that is a vector sum of the first blaze angle 834 of the first blazed transmission diffraction grating component 810 and the second blaze angle 838 of the second blazed transmission diffraction grating component 820. In an embodiment, the electromagnetic beam 830 incident on the first blazed transmission diffraction grating component exits the second blazed transmission diffraction grating component as a steered electromagnetic beam 836 having a direction (azimuth angle θ 839 and zenith angle φ, illustrated by the second blaze angle 838) that is a vector sum of the first deflection angle of the first blazed transmission diffraction grating component and the second deflection angle of the second blazed transmission diffraction grating component. In an embodiment, the steered electromagnetic beam has a controllable tilt at an angle φ relative to the coaxial axis 805. In an embodiment, the steered electromagnetic beam has a controllable rotation at an azimuth angle θ about the coaxial axis 805. In an embodiment, the electromagnetic beam steering structure is configured to steer the electromagnetic beam 830 propagating along the coaxial axis normal to the first blazed transmission diffraction grating component and the second blazed transmission diffraction grating component to an azimuth angle θ and a zenith angle φ between zero and a finite angle from the coaxial axis. In an embodiment, the electromagnetic beam steering structure is configured to steer the electromagnetic beam to a selectable portion of a field of regard. In an embodiment, the electromagnetic beam steering structure is configured to steer the electromagnetic beam within a continuous range of directions within a field of regard.

In an embodiment, the apparatus 800 includes a beam controller 880 configured to calculate a rotational position of the first blazed transmission diffraction grating component 810 about the coaxial axis 805 and a rotational position of the second blazed transmission diffraction grating component about the coaxial axis pointing the steered electromagnetic beam at the selected target 295. In an embodiment, the apparatus includes an electromagnetic beam generator configured to transmit the electromagnetic beam.

Various embodiments or variations of the first blazed transmission diffraction grating component 810 are described herein. In an embodiment, the second blazed transmission diffraction grating component 820 may include one or more of the embodiments or variations described for the first planar refractive component. For example, the second blazed transmission grating may include a major surface 824.

Figure 9:
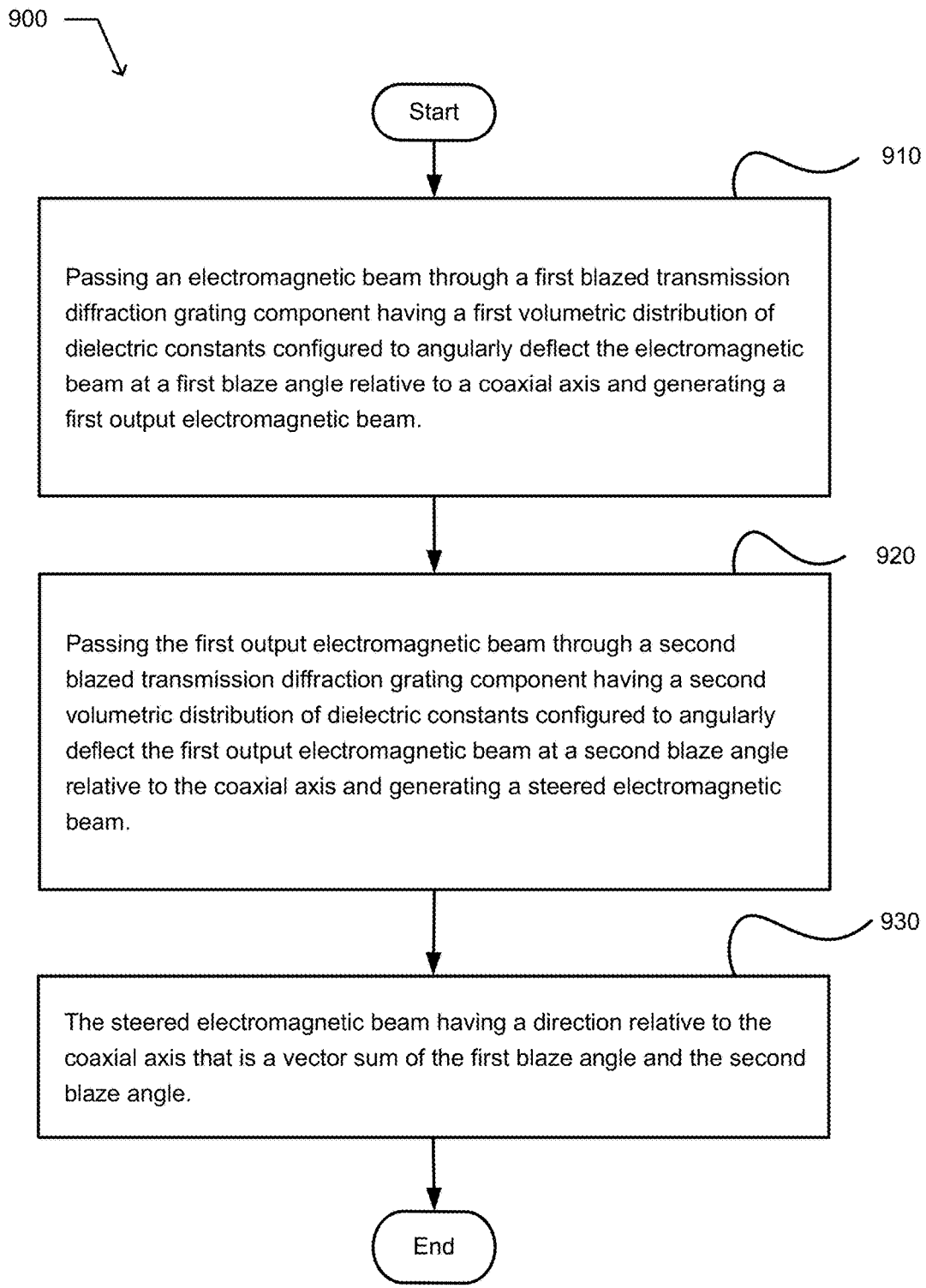
FIG. 9 illustrates an example operational flow.

FIG. 9 illustrates an example operational flow 900. After a start operation, the operational flow includes a first deflection operation 910. The first deflection operation includes passing an electromagnetic beam through a first blazed transmission diffraction grating component having a first volumetric distribution of dielectric constants configured to angularly deflect the electromagnetic beam at a first blaze angle relative to a coaxial axis, and generating a first output electromagnetic beam. In an embodiment, the first deflection operation may be implemented by passing the electromagnetic beam 830 through the first blazed transmission diffraction grating component 810 having the first volumetric distribution of dielectric constants 812 configured to angularly deflect the electromagnetic beam at the first blaze angle 834 relative to the coaxial axis 805, and generating the first output electromagnetic beam 832 as described in conjunction with FIG. 8. A second deflection operation 920 includes passing the first output electromagnetic beam through a second blazed transmission diffraction grating component having a second volumetric distribution of dielectric constants configured to angularly deflect the first output electromagnetic beam at a second blaze angle relative to the coaxial axis and generating a steered electromagnetic beam. The steered electromagnetic beam having a direction relative to the coaxial axis that is a vector sum of the first blaze angle and the second blaze angle. In an embodiment, the second deflection operation may be implemented by passing the first output electromagnetic beam 832 through the second blazed transmission diffraction grating component 820 having the second volumetric distribution of dielectric constants 822 configured to angularly deflect the first output electromagnetic beam at the second blaze angle 838 relative to the coaxial axis and generating the steered electromagnetic beam 836 as described in conjunction with FIG. 8. The operational flow includes an end operation.

In an embodiment, the first deflection operation 910 includes passing an electromagnetic beam through a first blazed transmission diffraction grating component having a first volumetric distribution of dielectric constants, wherein the first volumetric distribution of dielectric constants are divided into a plurality of sub-wavelength voxels having a maximum dimension of less than half of the wavelength of the electromagnetic beam, and each voxel assigned one of a plurality of dielectric constants to approximate the first volumetric distribution of dielectric constants. In an embodiment, the second deflection operation 920 includes passing the first output electromagnetic beam through a second blazed transmission diffraction grating component having a second volumetric distribution of dielectric constants, wherein the second volumetric distribution of dielectric constants divided into a plurality of sub-wavelength voxels having a maximum dimension of less than half of a wavelength of the electromagnetic beam frequency, and each voxel assigned one of a plurality of dielectric constants to approximate the second volumetric distribution of dielectric constants.

In an embodiment, the operational flow 900 includes rotating the first blazed transmission diffraction grating component around the coaxial axis to a first selected position, and rotating the second blazed transmission diffraction grating component around the coaxial axis to a second selected position. The steered electromagnetic beam has an azimuth angle θ and a zenith angle ϕ between zero and a finite angle from the coaxial axis. The azimuth angle θ and the zenith angle ϕ are responsive to the first blaze angle, the second blaze angle, the first selected position, and the second selected position. In an embodiment, the operational flow includes receiving information indicative of a position of the target 295 in a three dimensional space, and determining the first selected position and the second selected position pointing the steered electromagnetic beam at the target. In an embodiment, the operational flow includes initiating the electromagnetic beam incident on the first blazed transmission diffraction grating component.

Figure 10:
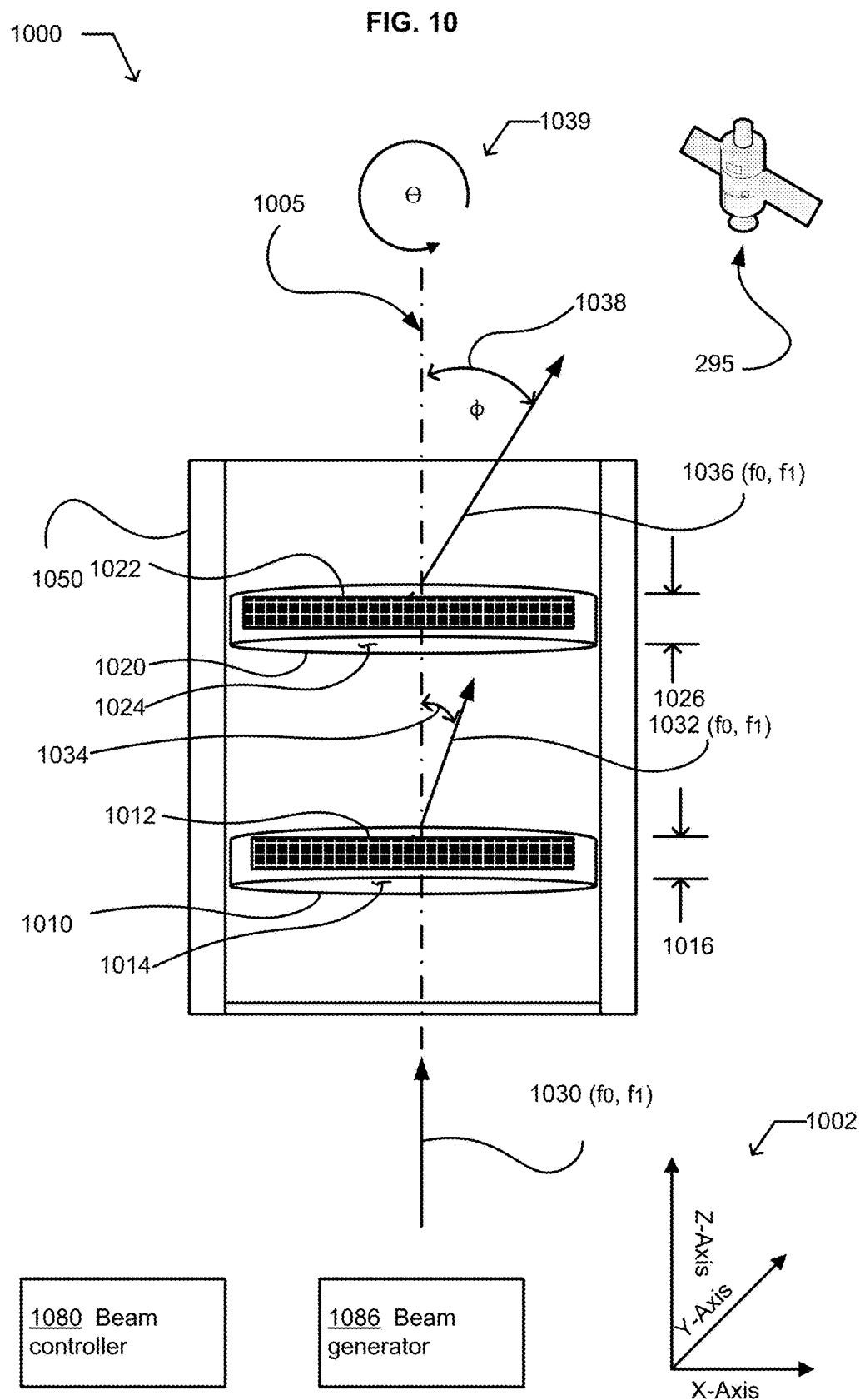
FIG. 10 illustrates an example dual-channel electromagnetic beam steering apparatus.

FIG. 10 illustrates an example dual-channel electromagnetic beam steering apparatus 1000 and a reference three-dimensional axis 1002. The apparatus includes a first dual-channel blazed transmission diffraction grating component 1010 having a first volumetric distribution of dielectric constants 1012 configured to deflect at a first blaze angle 1034 (i) a first electromagnetic beam 1030 f0 having a first frequency and (ii) a second electromagnetic beam 1030 f1 having a second frequency. In an embodiment, the first frequency includes a first operational channel or a first service band. In an embodiment, the second frequency includes a second operational channel or a second service band. The apparatus includes a second dual-channel blazed transmission diffraction grating component 1020 including a second volumetric distribution of dielectric constants 1022 configured to deflect at a second blaze angle 1038 (i) the first electromagnetic beam 1030 f0 having a first frequency and (ii) the second electromagnetic beam 1030 f1 having a second frequency. The apparatus includes an electromagnetic beam steering structure 1050 configured to independently rotate the first dual-channel blazed transmission diffraction grating component and second dual-channel blazed transmission diffraction grating component about a coaxial axis 1005 such that the first and second electromagnetic beams incident on the first dual-channel blazed transmission diffraction grating component exit the second dual-channel blazed transmission diffraction grating component as steered first and second electromagnetic beams.

In an embodiment, the first volumetric distribution of dielectric constants 1012 are divided into a first plurality of sub-wavelength voxels having a maximum dimension of less than half of a wavelength of the first frequency or the second frequency, and each voxel is assigned one of a plurality of dielectric constants to approximate the first volumetric distribution of dielectric constants 1022. In an embodiment, the second volumetric distribution of dielectric constants are divided into a second plurality of sub-wavelength voxels having a maximum dimension less than half of a wavelength of the first frequency or the second frequency, and each voxel is assigned one of a plurality of dielectric constants to approximate the second volumetric distribution of dielectric constants.

Various embodiments or variations of the first dual-channel blazed transmission diffraction grating component 1010 are described herein. In an embodiment, the second dual-channel blazed transmission diffraction grating component 1020 may include one or more of the embodiments or variations described for the first planar refractive component. For example, the second blazed transmission grating may include a major surface 1024.

Figure 11:
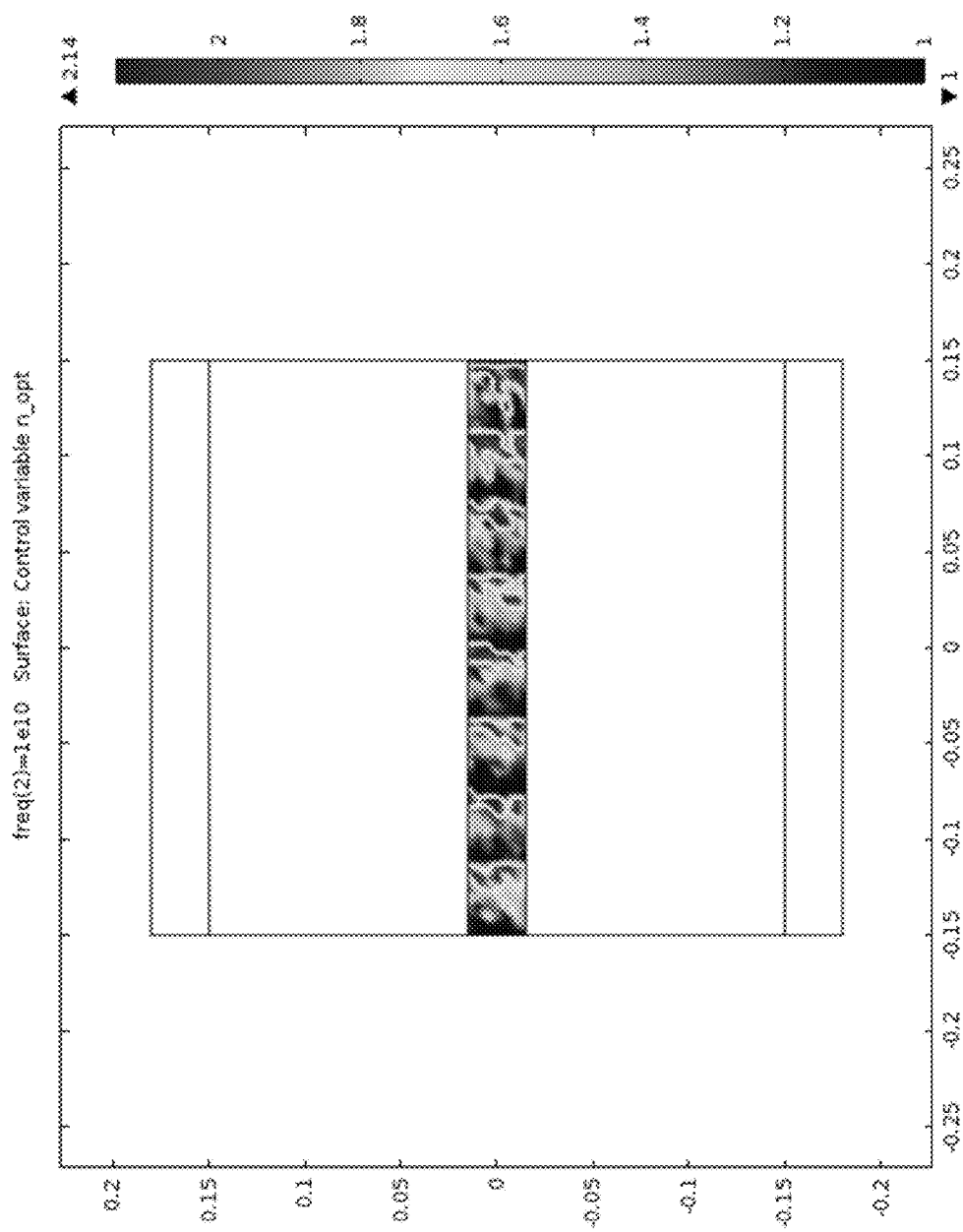
FIG. 11 illustrates modeling results for a dual-channel blazed transmission diffraction grating component having a volumetric distribution of dielectric constants.
Figure 12A:
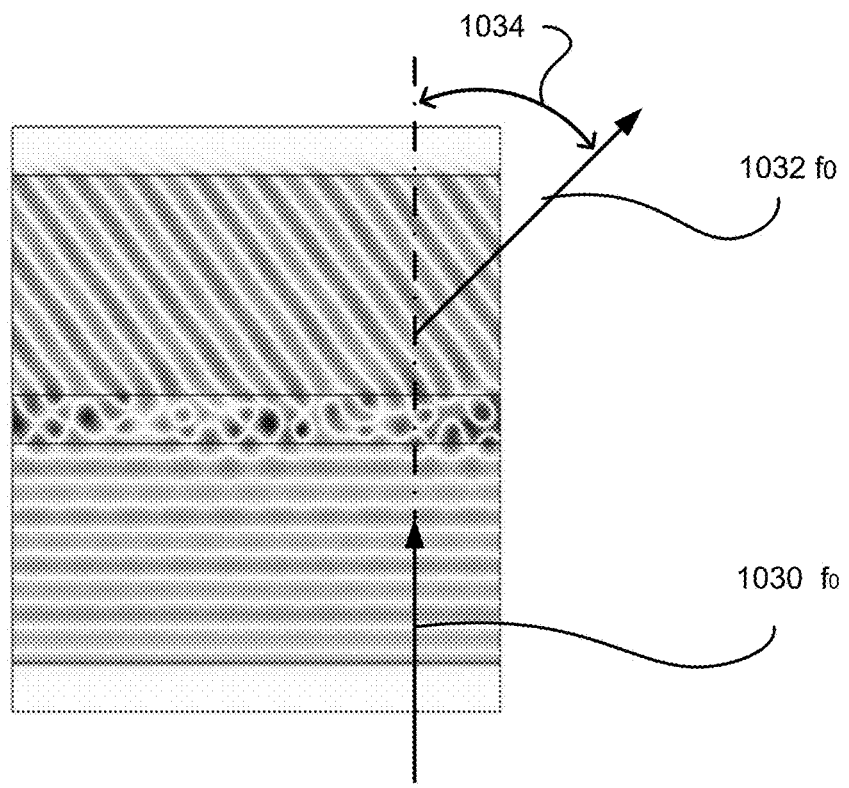
FIG. 12A illustrates a deflection of the first electromagnetic beam at frequency f0 at a selected blaze angle.
Figure 12B:
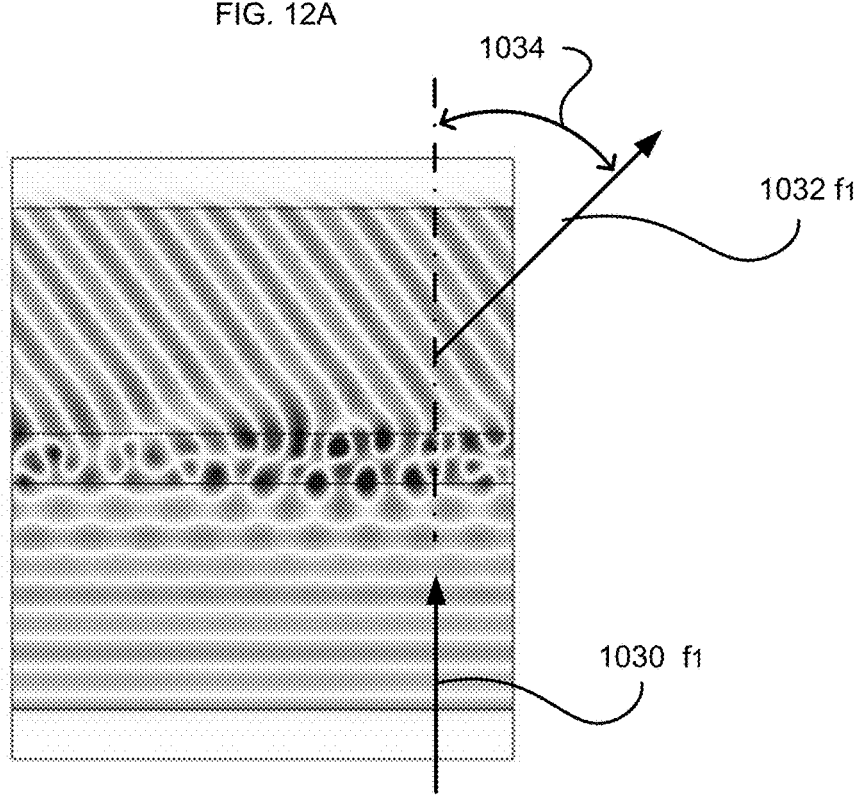
FIG. 12B illustrates a deflection of the second electromagnetic beam at frequency f1 at the selected blaze angle of FIG. 12A.

FIGS. 11 and 12 illustrate modeling results for a dual-channel blazed transmission diffraction grating component having a volumetric distribution of dielectric constants configured to deflect at a blaze angle for example such as the first dual-channel blazed transmission diffraction grating component 1010 or the second dual-channel blazed transmission diffraction grating component 1020 of FIG. 10. The modeling was performed using Compsol Multiphysics® Modeling Software, with f0 being 10 GHz and f1 being 8.75 GHz. FIG. 11 illustrates a volumetric distribution of dielectric constants in a dual-channel blazed transmission diffraction grating component configured to deflect an electromagnetic beam at a specified blaze angle. FIG. 12A illustrates a deflection of the first electromagnetic beam 1030 f0 at a selected blaze angle, illustrated as the first blaze angle 1034. FIG. 12B illustrates a deflection of the second electromagnetic beam 1030 f1 at the selected blaze angle, illustrated as the first blaze angle 1034.

The modeling results illustrated in FIGS. 11 and 12 demonstrate that a dual-channel blazed transmission diffraction grating component having a volumetric distribution of dielectric constants defining a constant refractive index is achievable using low-loss dielectrics with a dielectric permittivity ranging between one and about two. In an embodiment, a dual-channel electromagnetic beam steering apparatus may implement a frequency duplexing electromagnetic communications system. For example, a satellite communications system, an air-to-ground system, or an LTE system that use one channel for uplink and another channel for downlink may be implement using the dual-channel electromagnetic beam steering apparatus 1000.

In an embodiment, the second frequency is not less than 87.5% of the first frequency. In an embodiment, the second frequency is not less than 90% of the first frequency. In an embodiment, the second frequency is not less than 92.5% of the first frequency.

In an embodiment, the first volumetric distribution of dielectric constants 1012 is approximated using one or more discrete materials having specific dielectric constants. In an embodiment, the first dual-channel blazed transmission diffraction grating component 1010 and the second dual-channel blazed transmission diffraction grating component 1020 have substantially similar volumetric distributions of dielectric constants (1012 and 1022). In an embodiment, the first dual-channel blazed transmission diffraction grating component and the second dual-channel blazed transmission diffraction grating component have dissimilar volumetric distributions of dielectric constants. In an embodiment, the first volumetric distribution of dielectric constants is selected based on an equation for a holographic solution.

In an embodiment, the first volumetric distribution of dielectric constants 1012 is selected using an optimization algorithm in which the dielectric constants are treated as optimizable variables. In an embodiment, the dielectric constants are binary (0, 1). For example, binary dielectric constants are easier to three-dimensionally print. In an embodiment, the dielectric constants are a quasi-continuous gray scale with a range from a minimum to a maximum value, for example 1-10. A goal in optimizing the first volumetric distribution of dielectric constants is to minimize a deviation between a goal or desired power distribution at a first blaze angle and an achievable or actual power distribution at the first blaze angle for both the first frequency and the second frequency. In an embodiment, standard optimization techniques may be used. For example, least squares methodology may be used to minimize a deviation between a goal or desired first blaze angle and an achievable or actual first blaze angle for the first frequency and the second frequency. In an embodiment, the real and imaginary parts of the dielectric constants are treated as individually optimizable variables. In an embodiment, the optimization algorithm includes modifying at least one optimizable variable and determining a cost function for the modification. In an embodiment, the optimization algorithm includes determining a gradient of the cost function based on its partial derivatives with respect to each of the optimizable variables. In an embodiment, the optimization algorithm includes determining a sensitivity vector of a given configuration using an adjoint sensitivity algorithm. In an embodiment, the optimization algorithm comprises a constrained optimization algorithm in which the dielectric constants are treated as optimization variables constrained to have real parts greater than or equal to approximately one and imaginary parts equal to or approximately zero. In an embodiment, the optimization algorithm includes starting with an initial guess corresponding to a solution. Example optimization algorithms are described U.S. patent application Ser. No. 14/638,961, entitled HOLOGRAPHIC MODE CONVERSION FOR ELECTROMAGNETIC RADIATION, naming Tom Driscoll et al. as inventors, filed Mar. 4, 2015.

In an embodiment, the first dual-channel blazed transmission diffraction grating component 1010 includes two opposed generally planar and parallel major surfaces and a thickness 1016 that is less than the free-space wavelength of the electromagnetic beam 1030. In an embodiment, a major surface 1014 of the first dual-channel blazed transmission diffraction grating component 1010 includes a generally or substantially flat major surface. In an embodiment, a receiving or transmitting surface of the first dual-channel blazed transmission diffraction grating component 1010 includes an arbitrary surface approximating a flat surface.

In an embodiment, the first dual-channel blazed transmission diffraction grating component 1010 includes a first dual-channel planar blazed transmission diffraction grating. In an embodiment, the second dual-channel blazed transmission diffraction grating component 1020 includes a second dual-channel blazed transmission diffraction grating. In an embodiment, the first dual-channel blazed transmission diffraction grating component and the second dual-channel blazed transmission diffraction grating component each have a thickness (1016, 1026) less than the free-space wavelength of the incident electromagnetic beam 1030 (hereafter free-space subwavelength thickness). In an embodiment, the free-space subwavelength thickness includes a subwavelength thickness of less than one-half of the free-space wavelength of the electromagnetic beam. In an embodiment, the free-space subwavelength thickness includes a subwavelength thickness of less than one-fifth of the free-space wavelength of the electromagnetic beam. In an embodiment, the free-space subwavelength thickness includes a subwavelength thickness of less than one-tenth of the free-space wavelength of the electromagnetic beam.

In an embodiment, the electromagnetic beam steering structure 1050 includes an electronically controlled electromagnetic beam steering structure. In an embodiment, the electromagnetic beam steering structure is configured to independently rotate or counter rotate the first dual-channel blazed transmission diffraction grating component 1010 and the second dual-channel blazed transmission diffraction grating component 1020 relative to the coaxial axis 1005. In an embodiment, the electromagnetic beam steering structure is configured to rotate the first dual-channel blazed transmission diffraction grating component and the second dual-channel blazed transmission diffraction grating component about the coaxial axis while maintaining an electromagnetic beam path or alignment through the first dual-channel blazed transmission diffraction grating component and the second dual-channel blazed transmission diffraction grating component.

In an embodiment, the apparatus 1000 includes a beam controller 1080 configured to calculate a rotational position of the first dual-channel blazed transmission diffraction grating component 1010 about the coaxial axis 1005 and a rotational position of the second dual-channel blazed transmission diffraction grating component 1020 pointing the steered electromagnetic beam at the selected target 295. In an embodiment, the apparatus includes an electromagnetic beam generator 1086 configured to transmit the electromagnetic beam 1030.

Various embodiments or variations of the first dual-channel blazed transmission diffraction grating component 1010 are described herein. In an embodiment, the second dual-channel blazed transmission diffraction grating component 1020 may include one or more of the embodiments or variations described for the first dual-channel blazed transmission diffraction grating component 1010.

Figure 13:
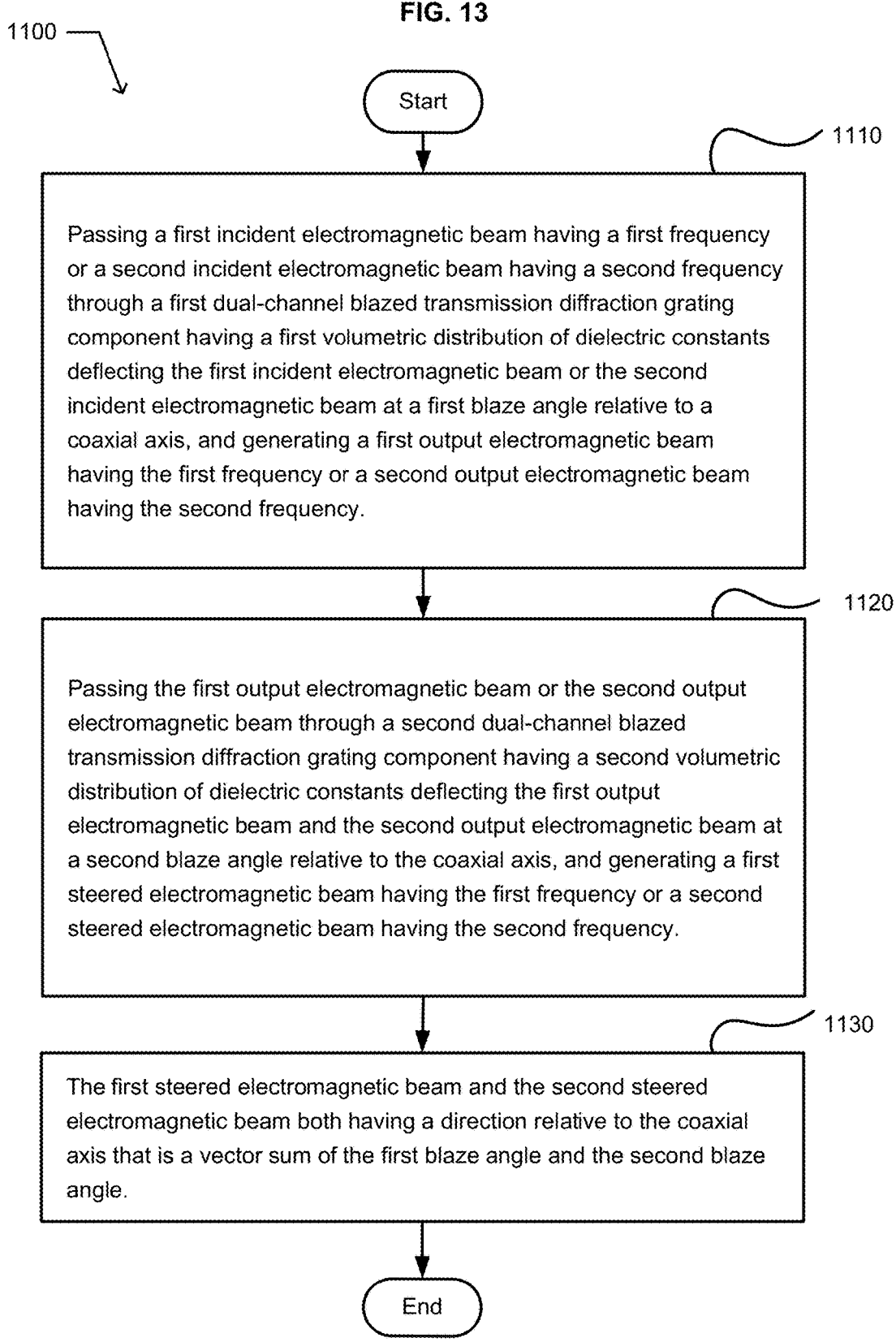
FIG. 13 illustrates an example operational flow.

FIG. 13 illustrates an example operational flow 1100. After a start operation, the operational flow includes a first deflection operation 1110. The first deflection operation includes passing a first incident electromagnetic beam having a first frequency or a second incident electromagnetic beam having a second frequency through a first dual-channel blazed transmission diffraction grating component having a first volumetric distribution of dielectric constants deflecting the first incident electromagnetic beam or the second incident electromagnetic beam at a first blaze angle relative to a coaxial axis, and generating a first output electromagnetic beam having the first frequency or a second output electromagnetic beam having the second frequency. In an embodiment, the first deflection operation may be implemented by passing the first incident electromagnetic beam 1030 f0 having a first frequency or a second incident electromagnetic beam 1030 f1 having a second frequency through the first dual-channel blazed transmission diffraction grating component 1010 having the first volumetric distribution of dielectric constants 1012 deflecting the first incident electromagnetic beam or the second incident electromagnetic beam at the first blaze angle 1034 relative to the coaxial axis 1005, and generating the first output electromagnetic beam 1032 f0 having the first frequency or the second output electromagnetic beam 1032 f1 having the second frequency as described in conjunction with FIG. 10.

A second deflection operation 1120 includes passing the first output electromagnetic beam or the second output electromagnetic beam through a second dual-channel blazed transmission diffraction grating component having a second volumetric distribution of dielectric constants deflecting the first output electromagnetic beam or the second output electromagnetic beam at a second blaze angle relative to the coaxial axis, and generating a first steered electromagnetic beam having the first frequency or a second steered electromagnetic beam having the second frequency. The first steered electromagnetic beam and the second steered electromagnetic beam both having a direction relative to the coaxial axis that is a vector sum of the first blaze angle and the second blaze angle. In an embodiment, the second deflection operation may be implemented by passing the first output electromagnetic beam 1032 f0 or the second output beam 1032 f1 through a second dual-channel blazed transmission diffraction grating component 1020 having a second volumetric distribution of dielectric constants deflecting the first output electromagnetic beam or the second output beam at a second blaze angle 1038 relative to the coaxial axis 1005, and generating the first steered electromagnetic beam 1036 having the first frequency or the second steered electromagnetic beam having the second frequency as described in conjunction with FIG. 10. The operational flow includes an end operation.

In an embodiment, the first volumetric distribution of dielectric constants are divided into a first plurality of sub-wavelength voxels having a maximum dimension less than half of a wavelength of the first frequency or the second frequency, and each voxel is assigned one of a plurality of dielectric constants to approximate the first volumetric distribution of dielectric constants. In an embodiment, the second volumetric distribution of dielectric constants are divided into a second plurality of sub-wavelength voxels having a maximum dimension less than half of a wavelength of the first frequency or the second frequency, and each voxel is assigned one of a plurality of dielectric constants to approximate the second volumetric distribution of dielectric constants.

In an embodiment of the first deflection operation 1110, the passing a first electromagnetic beam includes passing a first electromagnetic beam having a first frequency and a second electromagnetic beam having a second frequency through the first dual-channel blazed transmission diffraction grating component having a first volumetric distribution of dielectric constants. In an embodiment of the second deflection operation 1120, the passing the first output electromagnetic beam includes passing the first output electromagnetic beam and the second output beam through the second dual-channel blazed transmission diffraction grating component.

In an embodiment, the operational flow 1100 includes rotating the first dual-channel blazed transmission diffraction grating component around the coaxial axis to a first selected position and rotating the second dual-channel blazed transmission diffraction grating component around the coaxial axis to a second selected position. The first steered electromagnetic beam and the second steered electromagnetic beam each have an azimuth angle $\theta$ and a zenith angle $\phi$ between zero and a finite angle from the coaxial axis. The azimuth angle $\theta$ and the zenith angle $\phi$ are responsive to the first blaze angle, the second blaze angle, the first selected position, and the second selected position. In an embodiment, the operational flow includes receiving information indicative of a position of a target in a three dimensional space, and determining the first selected position and the second selected position pointing the steered electromagnetic beam at the target 295. In an embodiment, the operational flow includes initiating the first electromagnetic beam or the second electromagnetic beam incident on the first dual-channel blazed transmission diffraction grating component.

Figure 14:
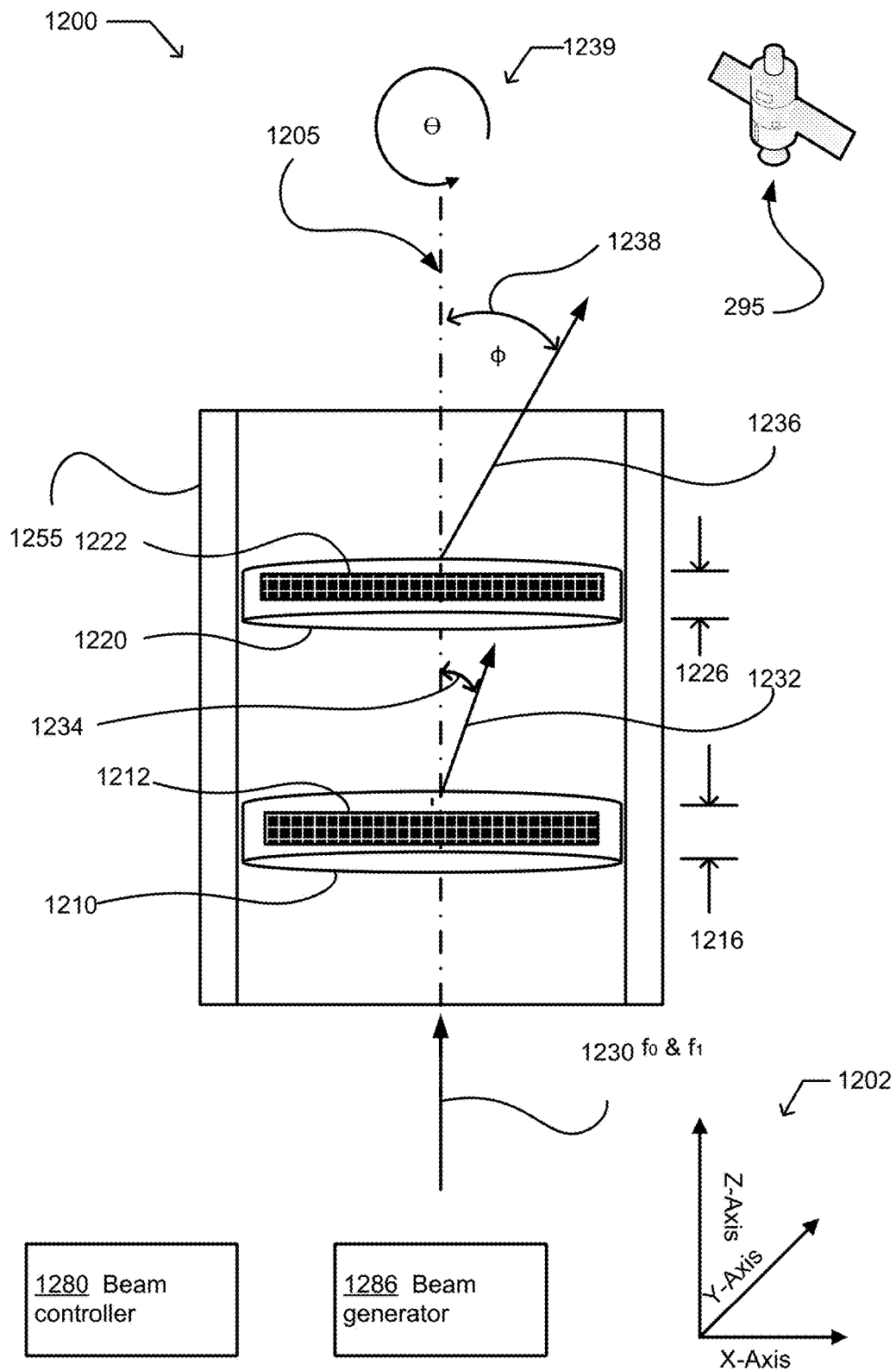
FIG. 14 illustrates an example electromagnetic beam steering apparatus.

FIG. 14 illustrates an example electromagnetic beam steering apparatus 1200 and a reference three-dimensional axis 1202. The electromagnetic beam steering apparatus includes a first electromagnetic beam deflecting structure 1210 including a first artificially structured effective media 1212 having at least two first electronically-selectable or controllable tangential refractive index gradients deflecting an electromagnetic beam 1230 incident on the first electromagnetic beam deflecting structure at a first deflection angle 1234, and generating a first output electromagnetic beam 1232. The first deflection angle is responsive to an electronically-selected linear refraction gradient of the at least two first electronically selectable tangential refractive index gradients. The electromagnetic beam steering apparatus includes a second electromagnetic beam deflecting structure

1220 including a second artificially structured effective media 1222 having at least two second electronically-selectable or controllable tangential refractive index gradients deflecting an electromagnetic beam incident on the second electromagnetic beam deflecting structure at a second deflection angle 1238. The second deflection angle is responsive to an electronically-selected linear refraction gradient of the at least two second electronically selectable tangential refractive index gradients.

In an embodiment, the first electromagnetic beam deflecting structure 1210 includes a first planar electromagnetic beam deflecting structure. In an embodiment, the second electromagnetic beam deflecting structure 1220 includes a second planar electromagnetic beam deflecting structure.

In an embodiment, the first electromagnetic beam deflecting structure 1210 or the second electromagnetic beam deflecting structure 1220 have a thickness 1216 and 1226 respectively that is less than the free-space wavelength of the incident electromagnetic beam 1230 (hereafter free-space subwavelength thickness). In an embodiment, the free-space subwavelength thickness includes a subwavelength thickness of less than one-half of the free-space wavelength of the electromagnetic beam. In an embodiment, the free-space subwavelength thickness includes a subwavelength thickness of less than one-fifth of the free-space wavelength of the electromagnetic beam. In an embodiment, the free-space subwavelength thickness includes a subwavelength thickness of less than one-tenth of the free-space wavelength of the electromagnetic beam.

In an embodiment, the first electromagnetic beam deflecting structure 1210 includes a first sub-instance of artificially structured effective media having a fixed tangential refractive index gradient and a second sub-instance of an individually electronically controlled artificially structured effective media having an electronically-selectable tangential refractive index gradient. The fixed tangential refractive index gradient and the electronically-selectable tangential refractive index gradient in combination deflecting an electromagnetic beam 1230 incident on the first electromagnetic beam deflecting structure at an electronically-selectable first deflection angle 1234. In an embodiment, the first electromagnetic beam deflecting structure includes a first sub-instance of artificially structured effective media having a fixed tangential refractive index gradient and a second sub-instance of an individually electronically controlled artificially structured effective media having an electronically-variable refractive index. The fixed tangential refractive index gradient and the electronically-variable refractive index in combination deflecting an electromagnetic beam incident on first electromagnetic beam deflecting structure at an electronically-variable first deflection angle. In an embodiment, the first electromagnetic beam deflecting structure includes an electronically-selectable piecewise linear refractive index deflecting an electromagnetic beam incident on the first electromagnetic beam deflecting structure at a first deflection angle responsive to an electronically-selected piecewise linear refractive index. In an embodiment, the first electromagnetic beam deflecting structure includes a blazed transmission diffraction grating having at least two electronically selectable blaze angles. In an embodiment, the first electromagnetic beam deflecting structure includes a composition of at least two sub-instances of individually electronically controlled artificially structured effective media. Each sub-instance of individually electronically controlled artificially structured effective media having a respective tangential refractive index gradient angularly deviating an electromagnetic beam at a first deflection angle if in a first state, for example an "on-state," and angularly deviating an electromagnetic beam at a second deflection angle if in a second state, for example an "off-state." In an embodiment, the first electromagnetic beam deflecting structure includes a composite structure of a first sub-instance of artificially structured effective media having a tangential refractive index gradient deflecting an electromagnetic beam at a first blaze angle and a second sub-instance of individually electronically controlled artificially structured effective media having a tangential refractive index gradient deflecting an electromagnetic beam at a second deflection angle if in a first state and angularly deviating an electromagnetic beam at a third deflection angle if in a second state.

In an embodiment, the first electromagnetic beam deflecting structure 1210 and the second electromagnetic beam deflecting structure 1220 are in a fixed spatial relationship to each other with planes described by their respective deflection angles in a substantially orthogonal relationship to each other.

In an embodiment, the apparatus 1200 includes a beam controller 1280 configured to select a first electronically-selectable or controllable tangential refractive index gradient from the at least two first electronically-selectable or controllable tangential refractive index gradients and a second electronically-selectable or controllable tangential refractive index gradient from the at least two first electronically-selectable or controllable tangential refractive index gradients pointing the steered electromagnetic beam at the selected target 295. In an embodiment, the beam controller is further configured to initiate the selected first electronically-selectable or controllable tangential refractive index gradient and the selected second electronically-selectable or controllable tangential refractive index gradient.

In an embodiment, the apparatus 1200 includes a positioning structure 1255 configured to maintain the first electromagnetic beam deflecting structure 1210 and the second electromagnetic beam deflecting structure 1220 in a fixed relationship to each other. In an embodiment, the positioning structure is configured to maintain the first electromagnetic beam deflecting structure and the second electromagnetic beam deflecting structure in a fixed relationship to each other such that an electromagnetic beam 1230 incident on the first electromagnetic beam deflecting structure exits the second electromagnetic beam deflecting structure as a steered electromagnetic beam 1238.

In an embodiment, the apparatus 1200 includes an electromagnetic beam steering structure configured to independently rotate the first electromagnetic beam deflecting structure 1210 and the second electromagnetic beam deflecting structure 1220 relative to a coaxial axis 1205 such that an electromagnetic beam incident 1230 on the first electromagnetic beam deflecting structure exits the second electromagnetic beam deflecting structure as a steered electromagnetic beam 1236. In an embodiment, the electromagnetic beam steering structure is configured to rotate the first electromagnetic beam deflecting structure around the coaxial axis in range of less than one-hundred degrees.

In an embodiment, the apparatus 1200 includes a beam controller 1280 configured to calculate a rotational position of the first electromagnetic beam deflecting structure 1210 about the coaxial axis 1205 and a rotational position the second electromagnetic beam deflecting structure about the coaxial axis pointing the steered electromagnetic beam 1230 at a selected target. In an embodiment, the apparatus includes an electromagnetic beam generator 1286 configured to transmit an electromagnetic beam to the first electromagnetic beam deflecting structure.

Various embodiments or variations of the first electromagnetic beam deflecting structure 1210 are described herein. In an embodiment, the second electromagnetic beam deflecting structure 1220 may include one or more of the embodiments or variations described for the first electromagnetic beam deflecting structure.

Figure 15:
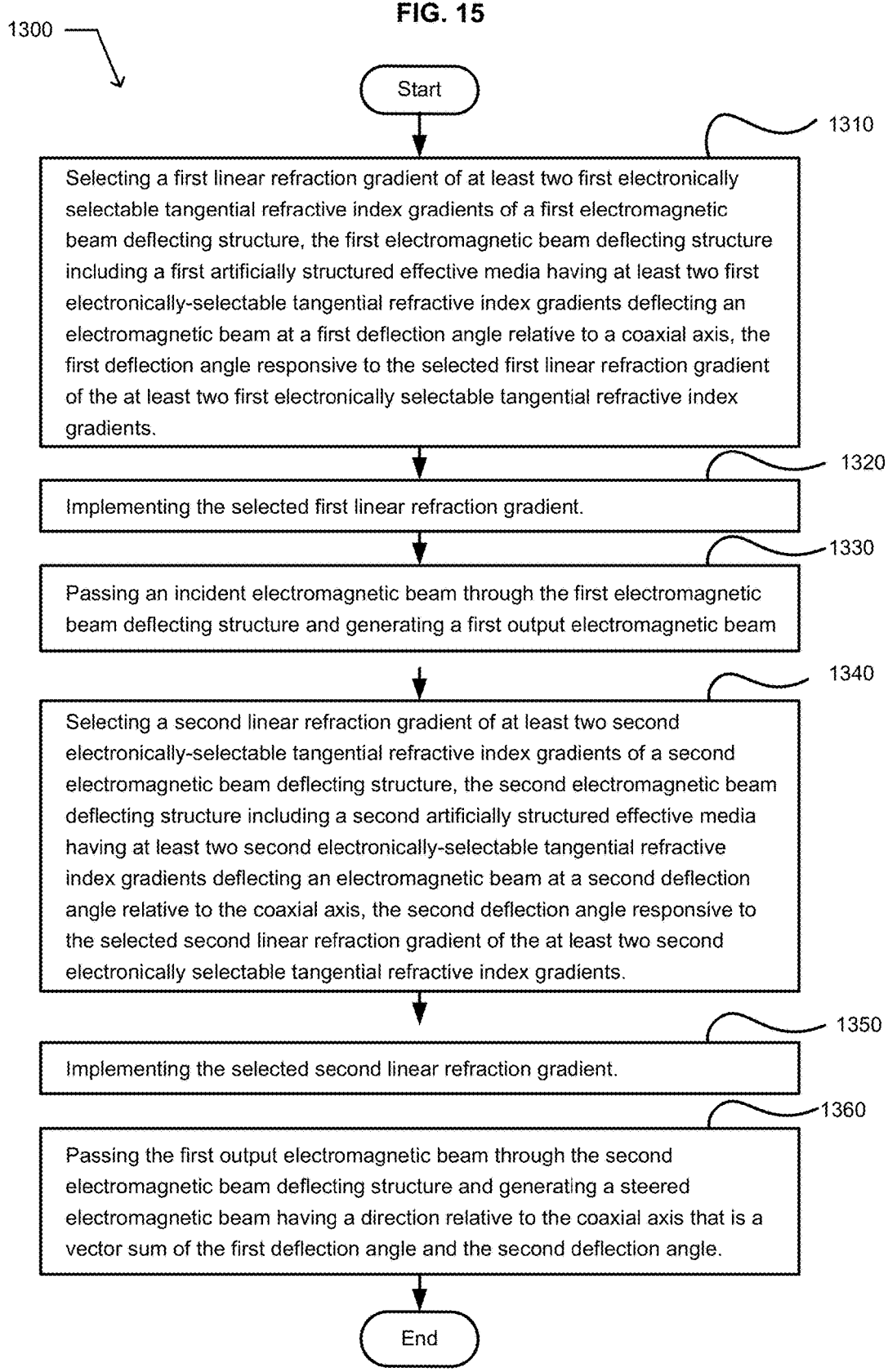
FIG. 15 illustrates an example operational flow.

FIG. 15 illustrates an example operational flow 1300. After a start operation, the operational flow includes a first deflection angle selection operation 1310. The first deflection angle selection operation includes selecting a first linear refraction gradient of at least two first electronically selectable tangential refractive index gradients of a first electromagnetic beam deflecting structure. The first electromagnetic beam deflecting structure including a first artificially structured effective media having at least two first electronically-selectable tangential refractive index gradients deflecting an electromagnetic beam at a first deflection angle relative to a coaxial axis. The first deflection angle is responsive to the selected linear refraction gradient of the at least two first electronically selectable tangential refractive index gradients. A first deflection angle setting operation 1320 includes implementing the selected first linear refraction gradient. A first deflection operation 1330 includes passing an incident electromagnetic beam through the first electromagnetic beam deflecting structure and generating a first output electromagnetic beam. A second deflection angle selection operation 1340 includes selecting a second linear refraction gradient of at least two second electronically-selectable tangential refractive index gradients of a second electromagnetic beam deflecting structure. The second electromagnetic beam deflecting structure including a second artificially structured effective media having at least two second electronically-selectable tangential refractive index gradients deflecting an electromagnetic beam at a second deflection angle relative to the coaxial axis. The second deflection angle is responsive to the selected second linear refraction gradient of the at least two second electronically selectable tangential refractive index gradients. A second deflection angle setting operation 1350 includes implementing the selected second linear refraction gradient. A second deflecting operation 1360 includes passing the first output electromagnetic beam through the second electromagnetic beam deflecting structure and generating a steered electromagnetic beam having a direction relative to the coaxial axis that is a vector sum of the first deflection angle and the second deflection angle. The operational flow includes an end operation. In an embodiment, the operational flow 1300 may be implemented using the electromagnetic beam steering apparatus 1200 described in conjunction with FIG. 14.

In an embodiment of the second deflecting operation 1360, the steered electromagnetic beam has an azimuth angle $\theta$, and a zenith angle $\phi$ between zero and a finite angle from the coaxial axis. The azimuth angle $\theta$ and the zenith angle $\phi$ are responsive to the first selected linear refraction gradient and the second selected linear refraction gradient.

In an embodiment, the operational flow 1300 includes receiving information indicative of a position of a target in a three dimensional space, and determining the first linear refraction gradient and the second linear refraction gradient pointing the steered electromagnetic beam at the target. In an embodiment, the operational flow includes initiating the electromagnetic beam incident on the first electromagnetic beam deflecting structure.

Figure 16:
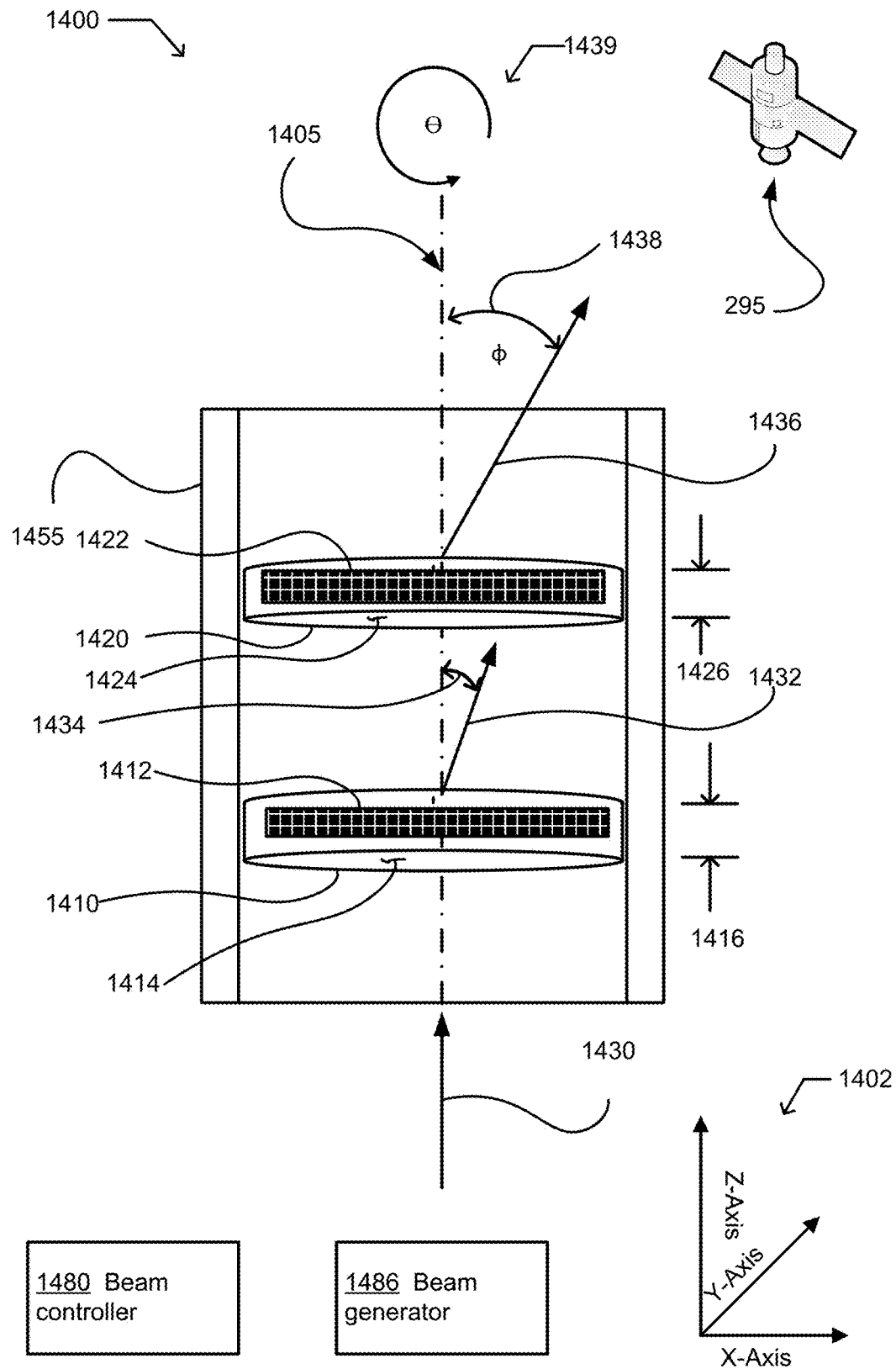
FIG. 16 illustrates an electromagnetic beam steering apparatus.

FIG. 16 illustrates an electromagnetic beam steering apparatus 1400 and a reference three-dimensional axis 1402. The electromagnetic beam steering apparatus includes a first electromagnetic beam deflecting structure 1410 including a first planar electronically-controllable artificially-structured effective media layer 1412 configured to deflect an electromagnetic beam 1430 at a selected first deflection angle of a first finite range of deflection angles 1434 from a coaxial axis 1405 normal to the first effective media layer. The electromagnetic beam steering apparatus includes a second electromagnetic beam deflecting structure 1420 including a second planar electronically-controllable artificially-structured effective media layer 1422 configured to deflect an electromagnetic beam at a selected second deflection angle of a second finite range of deflection angles 1438 from the coaxial axis normal to the second effective media layer. The first electromagnetic beam deflecting structure and the second electromagnetic beam deflecting structure have a fixed spatial relationship to each other with planes described by their respective range of deflection angles in a substantially orthogonal relationship to each other such that an electromagnetic beam incident on the first electromagnetic beam deflecting structure exits the second electromagnetic beam deflecting structure as a steered electromagnetic beam 1436.

In an embodiment, the steered electromagnetic beam 1436 has an azimuth angle $\theta$ and a zenith angle $\phi$ responsive to the selected first deflection angle of the first finite range of deflection angles 1434 and the selected second deflection angle of the second finite range of deflection angles 1438. In an embodiment, the steered electromagnetic beam has an azimuth angle $\theta$ of greater than 180 degrees. In an embodiment, the steered electromagnetic beam has an azimuth angle $\theta$ of greater than 270 degrees. In an embodiment, the steered electromagnetic beam 1436 has a zenith angle $\phi$ between zero and thirty degrees from the coaxial axis. In an embodiment, the steered electromagnetic beam 1436 has a zenith angle $\phi$ between zero and twenty degrees from the coaxial axis. In an embodiment, the steered electromagnetic beam 1436 has a zenith angle $\phi$ between zero and ten degrees from the coaxial axis.

In an embodiment, the first electronically-controllable artificially-structured effective media layer 1410 is configured to deflect the electromagnetic beam 1430 at a selected first deflection angle of a first finite range of deflection angles 1434 between one and five degrees from the coaxial axis. In an embodiment, the first finite range of deflection angles includes a range between one and ten degrees from the coaxial axis. In an embodiment, the first finite range of deflection angles includes a range between one and fifteen degrees from the coaxial axis. In an embodiment, the second finite range of deflection angles includes a range between one and five degrees from the coaxial axis.

In an embodiment, the first electronically-controllable artificially-structured effective media layer 1410 includes an electronically-controllable simple binary amplitude or phase grating structure. In an embodiment, the first electronically-controllable artificially-structured effective media layer includes an electronically-controllable artificially-structured blazed grating. In an embodiment, the electronically-controllable artificially-structured effective media layer includes an electronically-controllable metamaterial layer having tangential refractive index gradient or a piecewise tangential linear refractive index. In an embodiment, the first electronically-controllable artificially-structured effective media layer includes a first electronically-switchable layer of artificially structured effective media. In an embodiment, the first electronically-switchable layer of artificially structured effective media includes a first electronically-switchable layer of artificially structured effective media having a first electronically-controllable tangential refractive index gradient responsive to a first electronic control signal and deflecting the incident electromagnetic beam 1430 at a selectable first deflection angle of the first finite range of deflection angles. In an embodiment, the first electronically-switchable layer of artificially structured effective media includes a tangential refractive index gradient deflecting an incident electromagnetic beam at a first selected deflection angle responsive at least in part to a polarization of the incident polarized electromagnetic beam.

In an embodiment, the second electronically-controllable artificially-structured effective media layer 1420 includes a second electronically switchable layer of artificially structured effective media. In an embodiment, the second electronically switchable layer of artificially structured effective media includes a second electronically-switchable layer of artificially structured effective media having a second electronically-controllable tangential refractive index gradient responsive to a second electronic control signal and deflecting the incident electromagnetic beam at a selectable second deflection angle of the second finite range of deflection angles 1438.

In an embodiment, the apparatus 1400 includes a positioning structure 1455 configured to maintain the first electromagnetic beam deflecting structure 1410 and the second electromagnetic beam deflecting structure 1420 in the fixed spatial relationship to each other. In an embodiment, the apparatus includes a beam controller 1480 configured to select a first deflection angle of the first finite range of deflection angles 1434 from the coaxial axis and to select a second deflection angle of a second finite range of deflection angles 1438 from the coaxial axis pointing the steered electromagnetic beam 1430 at the selected target 295. In an embodiment, the beam controller is further configured to initiate the selected first deflection angle of a first finite range of deflection angles and the selected second deflection angle of a second finite range of deflection angles. In an embodiment, the apparatus includes an electromagnetic beam generator 1486 configured to transmit the incident electromagnetic beam 1430. In an embodiment, the positioning structure is configured to maintain a spatial relationship between the first electromagnetic beam deflecting structure, the second electromagnetic beam deflecting structure, and the electromagnetic beam generator. In an embodiment, the first electromagnetic beam deflecting structure 1410 or the second electromagnetic beam deflecting structure 1420 have a thickness 1416 and 1426 respectively that is less than the free-space wavelength of the incident electromagnetic beam 1430.

Various embodiments or variations of the first electromagnetic beam deflecting structure 1410 are described herein. In an embodiment, the second electromagnetic beam deflecting structure 1420 may include one or more of the embodiments or variations described for the first electromagnetic beam deflecting structure.

FIG. 17 illustrates an example operational flow 1500. After a start operation, the operational flow includes a first deflection angle selection operation 1510. The first angle selection operation includes selecting a first deflection angle of a first finite range of deflection angles relative to a coaxial axis. A first configuration operation 1520 includes electronically controlling a first electronically-controllable artificially-structured effective media layer of a first electromagnetic beam deflecting structure to deflect an incident electromagnetic beam at the selected first deflection angle. A first deflection operation 1530 includes passing an incident electromagnetic beam through the first electromagnetic beam deflecting structure and generating a first output electromagnetic beam 1432. A second angle selection operation 1540 includes selecting a second deflection angle of a second finite range of deflection angles relative to the coaxial axis. A second configuration operation 1550 includes electronically controlling a second electronically-controllable artificially-structured effective media layer of a second electromagnetic beam deflecting structure to deflect the first output electromagnetic beam at the selected second deflection angle. A second deflection operation 1560 includes passing the first output electromagnetic beam through the second electromagnetic beam deflecting structure and generating a steered electromagnetic beam 1436 having a direction relative to the coaxial axis that is a vector sum of the first selected deflection angle and the second selected deflection angle. In an embodiment, the steered electromagnetic beam has an azimuth angle $\theta$ and a zenith angle $\phi$ between zero and finite angle from the coaxial axis. The azimuth angle $\theta$ and the zenith angle $\phi$ are responsive to the selected first deflection angle and the selected second deflection angle. In an embodiment, the operational flow may be implemented using the electromagnetic beam steering apparatus 1400 described in conjunction with FIG. 16. The operational flow includes an end operation.

In an embodiment, the operational flow 1400 includes receiving information indicative of a position of a target in a three dimensional space, and selecting the first deflection angle and the second deflection angle pointing the steered electromagnetic beam at the target. In an embodiment, the operational flow includes initiating the electromagnetic beam incident on the first electromagnetic beam deflecting structure.

In an embodiment, an electromagnetic beam steering apparatus includes a planar antenna including a layer of artificially structured effective media having an electronically controlled tangential refractive index gradient responsive to an electronic control signal and configured to deflect a received electromagnetic beam by a selectable deflection angle. The apparatus includes a structure configured to mechanically rotate the planar antenna about a coaxial axis orthogonal to a major surface (x, y) of the planar component in response to a control signal. In an embodiment, the structure is configured to mechanically rotate through at least 90 degrees the planar antenna about a coaxial axis. In an embodiment, the electromagnetic beam is fed into an edge portion of the planar antenna.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an item selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to one skilled in the art. The various aspects and embodiments disclosed herein are for purposes of illustration and are not intended to be limiting, with the true scope and spirit being indicated by the following claims.

What is claimed is:

1. An electromagnetic beam steering apparatus comprising:
    a first blazed transmission diffraction grating component having a first volumetric distribution of dielectric constants configured to angularly deflect an electromagnetic beam at a first blaze angle;
    a second blazed transmission diffraction grating component having a second volumetric distribution of dielectric constants configured to angularly deflect the electromagnetic beam at a second blaze angle; and
    an electromagnetic beam steering structure configured to independently rotate the first blazed transmission diffraction grating component and the second blazed transmission diffraction grating component about a coaxial axis such that an electromagnetic beam incident on the first blazed transmission diffraction grating component exits the second blazed transmission diffraction grating component as a steered electromagnetic beam.

2. The apparatus of claim 1, wherein the first volumetric distribution of dielectric constants is divided into a plurality of sub-wavelength voxels having a maximum dimension of less than half of a wavelength of the electromagnetic beam, and each voxel is assigned one of a plurality of dielectric constants to approximate the first volumetric distribution of dielectric constants.

3. The apparatus of claim 1, wherein the first volumetric distribution of dielectric constants is approximated using one or more discrete materials having specific dielectric constants.

4. The apparatus of claim 1, wherein the second volumetric distribution of dielectric constants is divided into a plurality of sub-wavelength voxels having a maximum dimension of less than half of a wavelength of the electromagnetic beam, and each voxel is assigned one of a plurality of dielectric constants to approximate the second volumetric distribution of dielectric constants.

5. The apparatus of claim 1, wherein the second volumetric distribution of dielectric constants is approximated using one or more discrete materials having specific dielectric constants.

6. The apparatus of claim 1, wherein the first blazed transmission diffraction grating component and the second blazed transmission diffraction grating component have substantially similar volumetric distribution of dielectric constants.

7. The apparatus of claim 1, wherein the first blazed transmission diffraction grating component and the second blazed transmission diffraction grating component have dissimilar volumetric distributions of dielectric constants.

8. The apparatus of claim 1, wherein the first volumetric distribution of dielectric constants is selected based on an equation for a holographic solution.

9. The apparatus of claim 1, wherein the first volumetric distribution of dielectric constants is selected using an optimization algorithm in which the dielectric constants are treated as optimizable variables.

10. The apparatus of claim 9, wherein the real and imaginary parts of the dielectric constants are treated as individually optimizable variables.

11. The apparatus of claim 9, wherein the optimization algorithm includes modifying at least one optimizable variable and determining a cost function for the modification.

12. The apparatus of claim 9, wherein the optimization algorithm includes determining a gradient of the cost function based on its partial derivatives with respect to each optimizable variable.

13. The apparatus of claim 9, wherein the optimization algorithm includes determining a sensitivity vector of a given configuration using an adjoint sensitivity algorithm.

14. The apparatus of claim 9, wherein the optimization algorithm comprises a constrained optimization algorithm in which the dielectric constants are treated as optimization variables constrained to have real parts greater than or equal to approximately one and imaginary parts equal to or approximately zero.

15. The apparatus of claim 9, wherein the optimization algorithm includes starting with an initial guess corresponding to a holographic solution.

16. The apparatus of claim 1, wherein the electromagnetic beam steering structure includes an electronically controlled electromagnetic beam steering structure.

17. The apparatus of claim 1, wherein the electromagnetic beam steering structure is configured to independently rotate or counter rotate the first blazed transmission diffraction grating component and the second blazed transmission diffraction grating component relative to the coaxial axis.

18. The apparatus of claim 1, wherein the electromagnetic beam steering structure is configured to rotate the first blazed transmission diffraction grating component and the second blazed transmission diffraction grating component about the coaxial axis while maintaining an electromagnetic beam path through the first blazed transmission diffraction grating component and the second blazed transmission diffraction grating component.

19. The apparatus of claim 1, further comprising:
a beam controller configured to calculate a rotational position of the first blazed transmission diffraction grating component about the coaxial axis and a rotational position of the second blazed transmission diffraction grating component about the coaxial axis pointing the steered electromagnetic beam at a selected target.

20. The apparatus of claim 1, further comprising:
an electromagnetic beam generator configured to transmit the electromagnetic beam.

21. A method comprising:
passing an electromagnetic beam through a first blazed transmission diffraction grating component having a first volumetric distribution of dielectric constants configured to angularly deflect the electromagnetic beam at a first blaze angle relative to a coaxial axis and generating a first output electromagnetic beam; and
passing the first output electromagnetic beam through a second blazed transmission diffraction grating component having a second volumetric distribution of dielectric constants configured to angularly deflect the first output electromagnetic beam at a second blaze angle relative to the coaxial axis and generating a steered electromagnetic beam;
the steered electromagnetic beam having a direction relative to the coaxial axis that is a vector sum of the first blaze angle and the second blaze angle.

22. The method of claim 21, wherein the first volumetric distribution of dielectric constants divided into a plurality of sub-wavelength voxels having a maximum dimension of less than half of the wavelength of the electromagnetic beam, and each voxel assigned one of a plurality of dielectric constants to approximate the first volumetric distribution of dielectric constants.

23. The method of claim 21, wherein the second volumetric distribution of dielectric constants divided into a plurality of sub-wavelength voxels having a maximum dimension of less than half of a wavelength of the electromagnetic beam frequency, and each voxel assigned one of a plurality of dielectric constants to approximate the second volumetric distribution of dielectric constants.

24. The method of claim 21, further comprising:
rotating the first blazed transmission diffraction grating component around the coaxial axis to a first selected position; and
rotating the second blazed transmission diffraction grating component around the coaxial axis to a second selected position;
wherein the steered electromagnetic beam has an azimuth angle $\theta$ and a zenith angle $\phi$ between zero and a finite angle from the coaxial axis, the azimuth angle $\theta$ and the zenith angle $\phi$ responsive to the first blaze angle, the second blaze angle, the first selected position, and the second selected position.

25. The method of claim 24, further comprising:
receiving information indicative of a position of a target; and
determining the first selected position and the second selected position pointing the steered electromagnetic beam at the target.

26. The method of claim 21, further comprising:
initiating the electromagnetic beam incident on the first blazed transmission diffraction grating component.

27. A method comprising:
passing a first incident electromagnetic beam having a first frequency or a second incident electromagnetic beam having a second frequency through a first dual-channel blazed transmission diffraction grating component having a first volumetric distribution of dielectric constants deflecting the first incident electromagnetic beam or the second incident electromagnetic beam at a first blaze angle relative to a coaxial axis, and generating a first output electromagnetic beam having the first frequency or a second output electromagnetic beam having the second frequency; and
passing the first output electromagnetic beam or the second output electromagnetic beam through a second dual-channel blazed transmission diffraction grating component having a second volumetric distribution of dielectric constants deflecting the first output electromagnetic beam or the second output electromagnetic beam at a second blaze angle relative to the coaxial axis, and generating a first steered electromagnetic beam having the first frequency or a second steered electromagnetic beam having the second frequency;

the first steered electromagnetic beam and the second steered electromagnetic beam both having a direction relative to the coaxial axis that is a vector sum of the first blaze angle and the second blaze angle.

28. The method of claim 27, wherein the first volumetric distribution of dielectric constants are divided into a first plurality of sub-wavelength voxels having a maximum dimension less than half of a wavelength of the first frequency or the second frequency, and each voxel is assigned one of a plurality of dielectric constants to approximate the first volumetric distribution of dielectric constants.

29. The method of claim 27, wherein the second volumetric distribution of dielectric constants are divided into a second plurality of sub-wavelength voxels having a maximum dimension less than half of a wavelength of the first frequency or the second frequency, and each voxel is assigned one of a plurality of dielectric constants to approximate the second volumetric distribution of dielectric constants.

30. The method of claim 27, wherein the passing a first electromagnetic beam includes passing a first electromagnetic beam having a first frequency and a second electromagnetic beam having a second frequency through a first dual-channel blazed transmission diffraction grating component having a first volumetric distribution of dielectric constants.

31. The method of claim 27, wherein the passing the first output electromagnetic beam includes passing the first output electromagnetic beam and the second output electromagnetic beam through a second dual-channel blazed transmission diffraction grating component.

32. The method of claim 27, further comprising:
rotating the first dual-channel blazed transmission diffraction grating component around the coaxial axis to a first selected position; and
rotating the second dual-channel blazed transmission diffraction grating component around the coaxial axis to a second selected position;
wherein the first steered electromagnetic beam and the second steered electromagnetic beam each have an azimuth angle $\theta$ and a zenith angle $\phi$ between zero and a finite angle from the coaxial axis, where the azimuth angle $\theta$ and the zenith angle $\phi$ are responsive to the first blaze angle, the second blaze angle, the first selected position, and the second selected position.

33. The method of claim 32, further comprising:
receiving information indicative of a position of a target in a three dimensional space; and
determining the first selected position and the second selected position pointing the steered electromagnetic beam at the target.

34. The method of claim 27, further comprising:
initiating the first electromagnetic beam or the second electromagnetic beam incident on the first dual-channel blazed transmission diffraction grating component.

* * * * *